US012681270B2

(12) United States Patent
Zhang et al.

(10) Patent No.: US 12,681,270 B2
(45) Date of Patent: Jul. 14, 2026

(54) OPTICAL LENS, CAMERA MODULE, AND ELECTRONIC DEVICE

(71) Applicant: Huawei Technologies Co., Ltd., Shenzhen (CN)

(72) Inventors: Kaiyuan Zhang, Dongguan (CN); Daniel Manssen, Munich (DE); Yun Chiang Hsu, Dongguan (CN); Liuchang Xiao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 18/547,116

(22) PCT Filed: Jan. 25, 2022

(86) PCT No.: PCT/CN2022/073773
§ 371 (c)(1),
(2) Date: Aug. 18, 2023

(87) PCT Pub. No.: WO2022/174724
PCT Pub. Date: Aug. 25, 2022

(65) Prior Publication Data
US 2024/0134165 A1 Apr. 25, 2024

(30) Foreign Application Priority Data
Feb. 22, 2021 (CN) ......................... 202110198855.X

(51) Int. Cl.
| | |
|---|---|
| *G02B 9/64* | (2006.01) |
| *G02B 13/00* | (2006.01) |
| *H04N 23/958* | (2023.01) |

(52) U.S. Cl.
CPC ........... *G02B 9/64* (2013.01); *G02B 13/0045* (2013.01); *H04N 23/958* (2023.01)

(58) Field of Classification Search
None
See application file for complete search history.

(56) References Cited

U.S. PATENT DOCUMENTS

| | | | | |
|---|---|---|---|---|
| 12,411,310 B2 * | 9/2025 | Zhao | ......................... | G02B 9/64 |
| 2018/0239117 A1 * | 8/2018 | Lee | .................... | G02B 27/0025 |
| 2019/0271831 A1 | 9/2019 | Hsu et al. | | |
| 2020/0012078 A1 | 1/2020 | Kuo | | |
| 2020/0400924 A1 | 12/2020 | Xu et al. | | |
| 2021/0364746 A1 * | 11/2021 | Chen | ......................... | G02B 9/64 |
| 2021/0373284 A1 * | 12/2021 | Wang | .................... | H04N 23/54 |
| 2022/0099940 A1 * | 3/2022 | Sun | ......................... | G02B 13/04 |
| 2022/0206256 A1 * | 6/2022 | Chen | .................. | G02B 13/0045 |
| 2022/0221692 A1 * | 7/2022 | Tang | ......................... | G02B 9/64 |
| 2022/0308323 A1 * | 9/2022 | Zou | .................... | G02B 15/1465 |

FOREIGN PATENT DOCUMENTS

| | | |
|---|---|---|
| CN | 111913285 A | 11/2020 |
| CN | 112230371 A | 1/2021 |
| TW | I712830 B | 12/2020 |

* cited by examiner

*Primary Examiner* — Darryl J Collins
(74) *Attorney, Agent, or Firm* — Slater Matsil, LLP

(57) ABSTRACT

In accordance with an embodiment, an optical lens includes a plurality of lenses that are sequentially arranged from an object side of the optical lens to an image side of the optical lens. A first lens of the plurality of lenses is a lens bent towards the image side and has a negative focal power; and an object-side surface of at least one of the lenses comprises at least one inflection point.

20 Claims, 28 Drawing Sheets

10

1000

100

200

1001

100

17

510 nm
510 nm
555 nm
510 nm
470 nm 1.00

0.75

0.50

0.25

−0.50    −0.25    0.0    0.25    0.50

470 nm
510 nm
555 nm
610 nm
650 nm

OPTICAL LENS, CAMERA MODULE, AND ELECTRONIC DEVICE

CROSS-REFERENCE TO RELATED APPLICATIONS

This application is a National Stage of International Application No. PCT/CN2022/073773, filed on Jan. 25, 2022, which claims priority to Chinese Patent Application No. 202110198855.X, filed on Feb. 22, 2021, both of which are hereby incorporated by reference in their entireties.

TECHNICAL FIELD

Implementations of this application relate to the field of lenses, and in particular, to an optical lens, a camera module, and an electronic device.

BACKGROUND

As application of a photographing device becomes more popular, a requirement on an imaging lens of the photographing device is increasingly high. For example, the imaging lens needs to have a large field of view range. A current wide-angle lens or ultra-wide-angle lens can meet a requirement of large-field-of-view imaging. However, a larger field of view of the imaging lens leads to a larger distortion of a photographed image.

SUMMARY

Implementations of this application provide an optical lens, a camera module including the optical lens, and an electronic device including the camera module, so that a photographed image can have a small distortion. In this application, a quantity of lenses in the optical lens and a parameter of a lens are optimized and coordinated, to ensure that the optical lens can have a large field of view range and a small distortion in imaging of the optical lens.

According to a first aspect, an optical lens is provided. The optical lens includes a first lens, a second lens, a third lens, a fourth lens, a fifth lens, a sixth lens, and a seventh lens that are sequentially arranged from an object side to an image side. The first lens is a lens bent towards the image side, and the first lens has a negative focal power. Each of the first lens to the seventh lens includes an object-side surface facing the object side and an image-side surface facing the image side. Both an object-side surface and an image-side surface of each of the sixth lens and the seventh lens are free-form surfaces. There is at least one inflection point on the object-side surface of the sixth lens and/or the object-side surface of the seventh lens. The optical lens meets the following relationship:

$$FOV \geq 125°, \text{ and } |DIST| \leq 40\%.$$

FOV is a field of view of the optical lens, and DIST is a distortion parameter of imaging of the optical lens.

It should be noted that in this implementation of this application, when the optical lens is used as a boundary, a side on which an object to be photographed is located is an object side, and a surface that is of the lens and that faces the object side may be referred to as an object-side surface. When the optical lens is used as the boundary, a side on which an image of the object to be photographed is located is an image side, and a surface that is of the lens and that faces the image side may be referred to as an image-side surface.

In this application, the optical lens includes seven lenses. Parameters of the lenses are designed to be optimized and coordinated, so as to ensure that an image taken by the optical lens has a small distortion when the optical lens can have a large field of view range. Specifically, in this implementation of this application, the first lens is the lens bent towards the image side, and the first lens is a lens having the negative focal power, so that a scene within a larger field of view range can enter the optical lens, and the field of view of the optical lens is increased. In addition, in this implementation of this application, there is at least one inflection point on the object-side surface of the sixth lens and/or the object-side surface of the seventh lens, so that the sixth lens and/or the seventh lens function/functions well in adjusting an optical distortion and eliminating an aberration. This can reduce a distortion of the optical lens, and further ensure that the optical lens can have the large field of view and the small distortion, to achieve good optical effect. Specifically, in this implementation of this application, in the optical lens, $FOV \geq 125°$, and $|DIST| \leq 40\%$. That is, the optical lens in this implementation of this application has the large field of view and the small distortion.

In some implementations, there is at least one inflection point on an object-side surface of the first lens. This can effectively increase an optical incident angle of the optical lens, and further increase the field of view of the optical lens. In addition, the first lens having at least one inflection point on the object-side surface can have good distortion correction effect, to further reduce the distortion of the optical lens and improve the optical effect of the optical lens.

In some implementations, the optical lens meets the following relationship:

$$0.5 \leq |D1/IMH| \leq 1.5$$

D1 is a diameter of the first lens, and IMH is a diagonal length of an effective pixel region on an imaging plane of the optical lens.

In this implementation of this application, the diameter D1 of the first lens and an image height IMH of the image taken by the optical lens meet the foregoing relationship. To be specific, it can be ensured that the diameter of the first lens is close to the image height of the image taken by the optical lens. This avoids an excessively small diameter of the first lens, and further ensures that the optical lens has a large field of view. In addition, this can avoid an excessively small image height of the image taken by the optical lens, and further ensure that the optical lens has a high modulation transfer function.

In some implementations, the optical lens meets the following relationship:

$$1.5 \leq F\# \leq 2.8$$

F # is an aperture F-number of the optical lens. In this implementation of this application, when the aperture F-number of the optical lens meets the foregoing relationship, the optical lens can have sufficient incident light, thereby ensuring that the image taken by the optical lens can have good optical effect.

In some implementations, the optical lens meets the following relationship:

$$0.8 \leq |TTL/IMH| \leq 1.5.$$

TTL is a total track length of the optical lens, and IMH is a diagonal length of an effective pixel region on an imaging plane of the optical lens. In this implementation of this application, when the total track length of the optical lens and the image height of the image meet the foregoing relationship, it can be ensured that the optical lens has a high modulation transfer function and the lenses of the optical lens can be arranged more compactly. Therefore, the total track length of the optical lens can be small, and the optical lens can be miniaturized, to facilitate use in a small electronic device.

In some implementations, the optical lens meets the following relationship:

$$0.1 \leq |f/\text{TTL}| \leq 0.4$$

f is a focal length of the optical lens, and TTL is the total track length of the optical lens. When the total track length and the focal length of the optical lens meet the foregoing relationship, it can be ensured that the lenses of the optical lens can be arranged more compactly and a distance between the lens of the optical lens and the imaging plane can also be small, to ensure that the total track length of the optical lens can be small. Therefore, the optical lens can be miniaturized, to facilitate use in a small electronic device.

In some implementations, the optical lens meets the following relationship:

$$1.5 \leq |f1/f| \leq 2$$

f1 is a focal length of the first lens, and f is a focal length of the optical lens. In this implementation of this application, the focal length of the first lens and the focal length of the optical lens meet the foregoing relationship, and the focal power of the first lens can be properly allocated, so that the first lens can better increase a field of view, and coordinate to correct an aberration of the optical lens. This reduces a distortion, and improves imaging quality of the optical lens.

In some implementations, the optical lens meets the following relationship:

$$2.5 \leq |f7/f| \leq 4$$

f7 is a focal length of the seventh lens, and f is a focal length of the optical lens. In this implementation of this application, when the focal length of the seventh lens and the focal length of the optical lens meet the foregoing relationship, a focal power of the seventh lens can be properly allocated, to coordinate to correct an aberration of the optical lens. This reduces a distortion, and improves imaging quality of the optical lens.

In some implementations, each of the first lens to the seventh lens has a focal power, a combined focal power of the second lens and the third lens is a positive focal power, a combined focal power of the fourth lens and the fifth lens is a negative focal power, and a combined focal power of the sixth lens and the seventh lens is a negative focal power.

In this implementation, each lens has a focal power, to ensure that each lens can achieve specific optical effect, so as to reduce a quantity of lenses of the optical lens as much as possible and reduce the total track length of the optical lens while ensuring optical effect of the optical lens that needs to be achieved. Therefore, the optical lens is miniaturized. In addition, in this implementation of this application, the combined focal power of the second lens and the third lens is the positive focal power, the combined focal power of the fourth lens and the fifth lens is the negative focal power, and the combined focal power of the sixth lens and the seventh lens is the negative focal power, so that the lenses are optimized and coordinated, to reduce the distortion of the optical lens. In addition, the combined focal power of the fourth lens and the fifth lens is the negative focal power, and the combined focal power of the sixth lens and the seventh lens is the negative focal power, to expand a beam of light, so as to ensure that the optical lens has a large image height, so that the optical lens can match a photosensitive element with a maximum chief ray angle, and the modulation transfer function of the optical lens is improved.

In some implementations of this application, the fourth lens and the seventh lens each have a negative focal power, and the fourth lens and the seventh lens can diffuse light, to ensure that the optical lens has a large image height, so that the optical lens can match a photosensitive element with a maximum chief ray angle, and a modulation transfer function of the optical lens is improved. In addition, the fourth lens and the seventh lens can coordinate with another lens to correct a chromatic aberration and a distortion of the optical lens, so that the optical lens can achieve better optical effect.

According to a second aspect, this application further provides a camera module. The camera module includes a photosensitive element and the foregoing optical lens. The photosensitive element is located on an image side of the optical lens, and light is projected to the photosensitive element after passing through the optical lens.

An optical image obtained by the optical lens is converted into an electrical signal by using the photosensitive element, and then following steps such as image processing are performed, so that an image with good imaging quality can be obtained. In addition, it can be ensured that the optical lens in this application can have a large field of view and a small imaging distortion, to achieve good imaging effect. Therefore, in this application, the camera module including the foregoing optical lens can also photograph an image with a large field of view and a small distortion, that is, the camera module can have good imaging effect.

According to a third aspect, this application further provides an electronic device. The electronic device includes an image processor and the camera module. The image processor is communicatively connected to the camera module. The camera module is configured to: obtain image data and input the image data into the image processor. The image processor is configured to process the image data output to the image processor.

In this application, the image processor processes the image data obtained by the camera module, to obtain a better photographed picture or image. In addition, the camera module in this application can photograph an image with a large field of view and a small distortion, and can have good imaging effect. Therefore, the electronic device in this application can photograph an image with a large field of view and a small distortion, and can have good imaging effect.

DETAILED DESCRIPTION OF ILLUSTRATIVE EMBODIMENTS

Figure 1:
FIG. 1 is a schematic diagram of a structure of an electronic device according to an implementation of this application.
Figure 1:
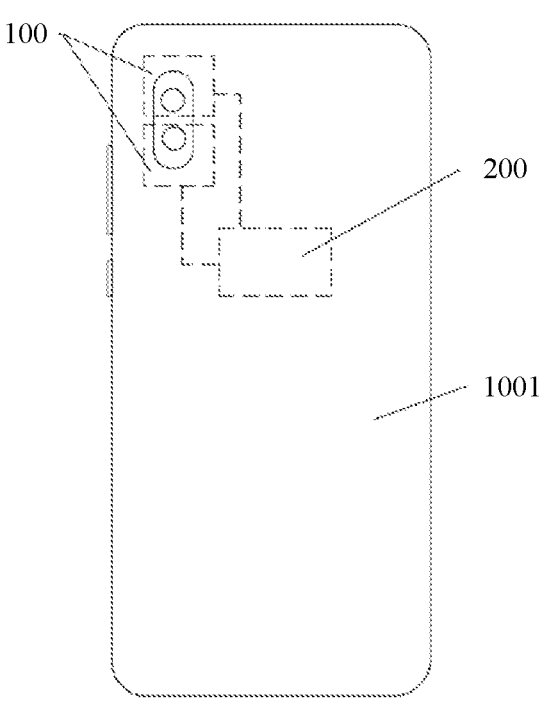

The following describes technical solutions in implementations of this application with reference to the accompanying drawings.

For ease of understanding, the following first explains and describes technical terms in this application.

A focal length (focal length, f for short), also referred to as a focal length, is a measure of how strongly an optical system converges or diverges light, and is a vertical distance from an optical center of a lens or a lens group to a focal plane when a clear image of an infinite scene is formed on the focal plane by using the lens or the lens group.

An aperture is an apparatus used to control an amount of light that passes through a lens and is radiated to a photosensitive element. An aperture size is represented by an F-number/F-number.

An aperture F-number (F #) is a ratio (a reciprocal of a relative aperture) of a focal length of a lens to a diameter of clear aperture of the lens. A smaller aperture F-number indicates a larger amount of light passing through the lens per unit time. A larger aperture F-number indicates a smaller depth of field and blurring of content of a photographed background.

A positive focal power, also referred to as a positive dioptric power, indicates that a lens has a positive focal length and has effect of converging light.

A negative focal power, also referred to as a negative dioptric power, indicates that a lens has a negative focal length and has effect of diverging light.

A total track length (total track length, TTL) is a total length from an end that is of the optical lens and that is away from an imaging plane, to the imaging plane, and is a main factor that forms a camera height.

An Abbe number, namely, a dispersion coefficient, is a refractive index difference ratio of an optical material at different wavelengths, and indicates a dispersion degree of the material.

An optical axis is light that vertically passes through a center of an ideal lens. When light parallel to the optical axis is emitted into a convex lens, in an ideal convex lens, all light is converged at one point behind the lens. This point at which all the light is converged is a focus.

Object side: When an optical lens is used as a boundary, a side on which a to-be-imaged scene is located is the object side.

Image side: When an optical lens is used as a boundary, a side on which an image of a to-be-imaged scene is located is the image side.

Object-side surface: A surface that is of a lens and that faces an object side is referred to as the object-side surface.

Image-side surface: A surface that is of a lens and that faces an image side is referred to as the image-side surface.

A distortion (distortion) is a difference between a display position of a point in an image and a position of the point in an ideal system.

Field of view (field of view, FOV): A lens of an optical instrument is used as a vertex, and an included angle formed by two edges of a maximum range that an object image of a measured object can pass through the lens is referred to as the field of view.

A free-form surface is a curved surface that cannot be formed by a primary analytical surface, but is formed by a curve surface that changes freely in a complex manner, namely, a free curve surface.

This application provides an electronic device. The electronic device may be a mobile phone, a tablet, a computer, a video camera, a camera, or an electronic device in another form that has a photographing function or an image shooting function. FIG. 1 is a schematic diagram of a structure of an electronic device woo according to an implementation of this application. In this implementation, the electronic device woo is a mobile phone. In another implementation, the electronic device woo may be a device in another form that has an image shooting function, such as a tablet or a camera.

The electronic device 1000 includes a camera module 100 and an image processor 200 that is communicatively connected to the camera module 100. The camera module 100 is configured to: obtain image data and input the image data into the image processor 200, and the image processor 200 processes the image data. A communication connection between the camera module 100 and the image processor 200 may include data transmission in an electrical connection manner such as a cabling connection, or may be implemented in another data transmission manner, such as an optical cable connection or wireless transmission.

A function of the image processor 200 is to: perform optimization processing on a digital image signal through a series of complex mathematical algorithm operations, and finally transmit a processed signal to a display or store the processed signal in a memory. The image processor 200 may be an image processing chip or a digital signal processing (digital signal processing, DSP) chip.

In the implementation shown in FIG. 1, the camera module 100 is disposed on a back side of the electronic device 1000, and is used as a rear-facing camera of the electronic device 1000. It may be understood that, in some implementations, the camera module 100 may alternatively be disposed on a front side of the electronic device 1000, and is used as a front-facing camera of the electronic device 1000. Both the front-facing camera and the rear-facing camera may be used to take a selfie, or may be used by a photographer to photograph another object.

Figure 2:
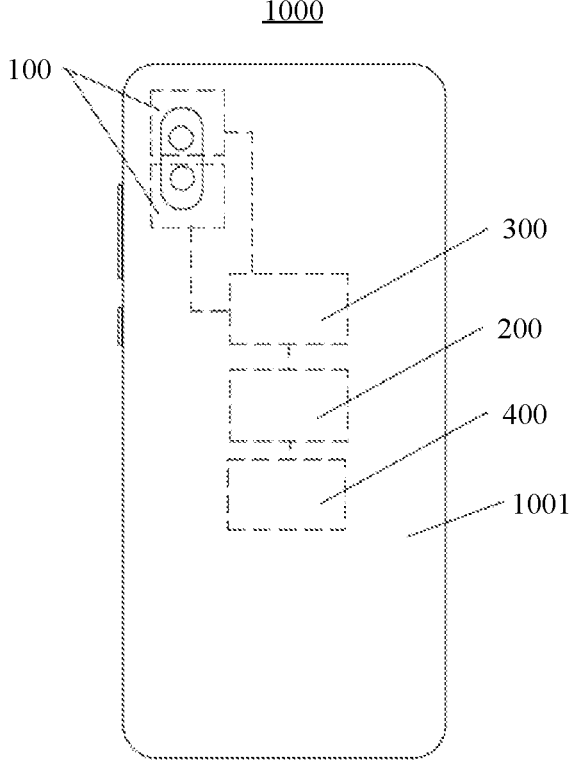
FIG. 2 is a schematic diagram of a structure of an electronic device according to another implementation of this application.

In some implementations, there are a plurality of camera modules 100, and a plurality of means two or more. The plurality of camera modules 100 can coordinate with each other to achieve better photographing effect. FIG. 2 is a schematic diagram of a structure of an electronic device 1000 according to another implementation of this application. In the implementation shown in FIG. 2, there are two rear-facing cameras of the electronic device 100. The two camera modules 100 are both communicatively connected to the image processor 200, so that the image processor 200 processes the image data of the two camera modules 100, to obtain a better photographed picture or image.

It should be understood that an installation position of the camera module wo of the electronic device 1000 in the implementation shown in FIG. 1 is merely an example. In some other implementations, the camera module 100 may be alternatively installed at another position on the mobile phone. For example, the camera module 100 may be installed in the upper middle or at the upper right corner of the back side of the mobile phone. Alternatively, the camera module 100 may not be disposed on a main body of the mobile phone, but may be disposed on a component that can move or rotate relative to the mobile phone. For example, the component may extend, retract, or rotate from the main body of the mobile phone. An installation position of the camera module 100 is not limited in this application.

Figure 3:
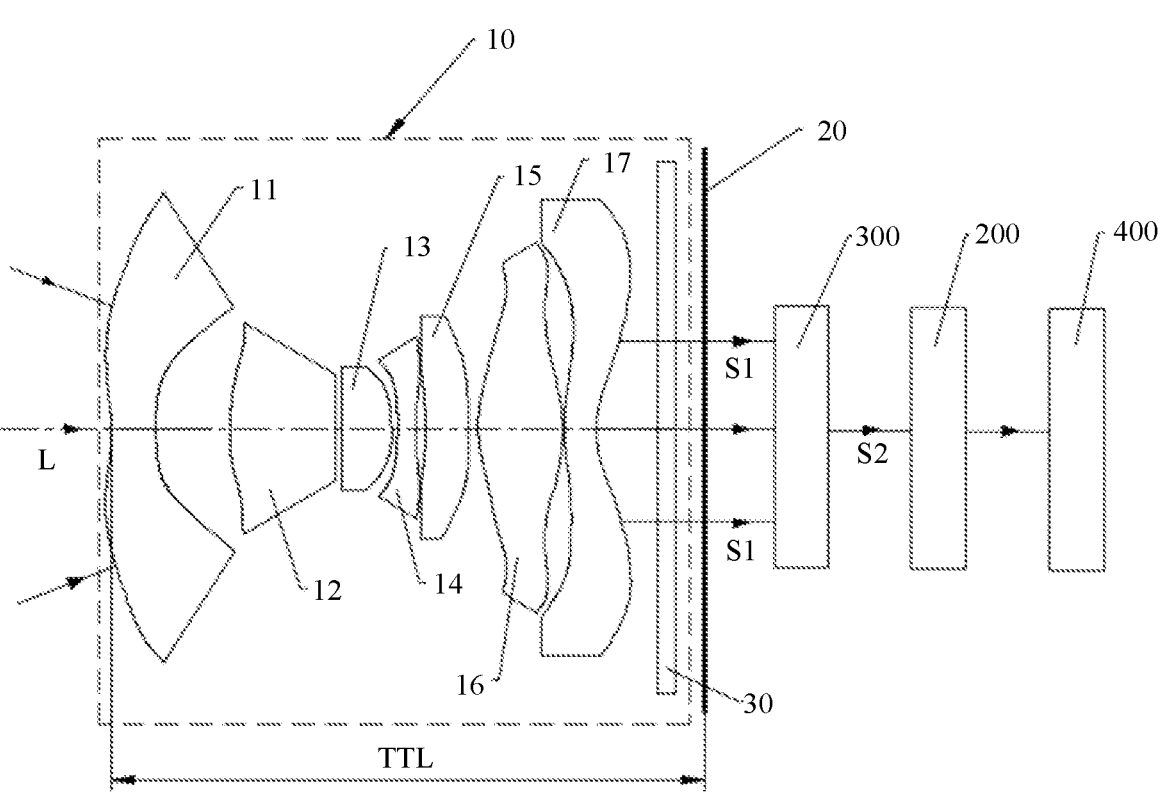
FIG. 3 is a schematic diagram of an imaging principle of the electronic device shown in FIG. 2.

FIG. 2 is the schematic diagram of the structure of the electronic device woo according to the another implementation of this application, and FIG. 3 is a schematic diagram of an imaging principle of the electronic device 1000 shown in FIG. 2. In some implementations, the electronic device 1000 further includes an analog-to-digital converter (which may also be referred to as an A/D converter) 300. Refer to FIG. 2. The analog-to-digital converter 300 is connected between the camera module 100 and the image processor 200. The analog-to-digital converter 300 is configured to: convert an analog image signal generated by the camera module 100 into a digital image signal and transmit the digital image signal to the image processor 200, then the image processor 200 processes the digital image signal, and finally an image or a video is displayed through a display screen or a display.

In some implementations, the electronic device 1000 further includes a memory 400. The memory 400 is communicatively connected to the image processor 200. After processing the digital image signal, the image processor 200 transmits the image to the memory 400, so that when the image needs to be viewed subsequently, the image can be searched for from the memory at any time and displayed on the display screen (as shown in FIG. 2). In some implementations, the image processor 200 further compresses the processed image digital signal, and then stores the compressed image digital signal into the memory 400, to save space of the memory 400. It should be noted that FIG. 2 is merely a schematic diagram of a structure of an implementation of this application. Positions, structures and the like of the camera module 100, the image processor 200, the analog-to-digital converter 300, and the memory 400 are merely examples.

Refer to FIG. 3. The camera module 100 includes an optical lens 10 and a photosensitive element 20. The photosensitive element 20 is located on an image side of the optical lens 10. The image side of the optical lens 10 is a side that is of the optical lens 10 and that is close to a to-be-imaged scene. When the camera module wo works, the to-be-imaged scene is imaged on the photosensitive element 20 by using the optical lens 10. Specifically, a working principle of the camera module 100 is as follows: The optical lens 10 generates an optical image through light L reflected by the to-be-imaged scene, and the optical image is projected to a surface of the photosensitive element 20; the photosensitive element 20 converts the optical image into an electrical signal, namely, an analog image signal S1, and transmits the analog image signal S1 obtained through conversion to the analog-to-digital converter 300; and the analog-to-digital converter 300 converts the analog image signal S1 into a digital image signal S2 and transmits the digital image signal S2 to the image processor 200.

The photosensitive element 20 is a semiconductor chip including hundreds of thousands to millions of photodiodes on its surface. When being irradiated by light, the photosensitive element 20 generates a charge, to convert an optical signal into an electrical signal. Optionally, the photosensitive element 20 may be any device that can convert an optical signal into an electrical signal. For example, the photosensitive element 20 may be a charge coupled device (charge coupled device, CCD), or may be a complementary metal-oxide conductor device (complementary metal-oxide semiconductor, CMOS).

The optical lens 10 affects imaging quality and imaging effect. The optical lens 10 includes a plurality of lenses arranged from an object side to an image side, and imaging is mainly performed according to a refraction principle of the lens. Specifically, light of a to-be-imaged object passes through the optical lens 10 and forms a clear image on a focal plane, and the image of a scene is recorded by using the photosensitive element 20 located on the focal plane. There may be an air thickness between adjacent lenses, or the adjacent lenses may be disposed close to each other. Main functions of the lenses are different, and different lenses coordinate with each other to achieve optimal imaging quality.

In some implementations, the optical lens 10 further includes an infrared cut-off filter 30, and the infrared cut-off filter 30 is located between the photosensitive element 20 and the lens of the optical lens 10. Light refracted by each lens of the optical lens 10 is irradiated on the infrared cut-off filter 30, and is transmitted to the photosensitive element 20 by using the infrared cut-off filter 30. The infrared cut-off filter 30 may filter out unnecessary light projected onto the photosensitive element 20, to prevent the photosensitive element 20 from generating a false color or a ripple, so as to improve effective resolution and color reproduction of the photosensitive element 20. This can avoid damage caused by some specific external light to the photosensitive element 20, to protect the photosensitive element 20.

Figure 4:
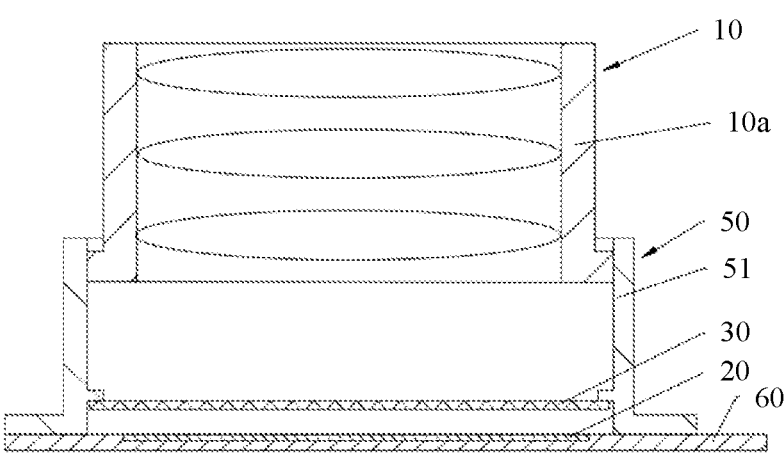
FIG. 4 is a schematic diagram of a structure of a camera module according to some implementations of this application.

FIG. 4 is a schematic diagram of a structure of the camera module 100 according to some implementations of this application. In some implementations, the optical lens 10 further includes a lens tube 10a. A plurality of lenses of the optical lens 10 are fastened in the lens tube 10a, and the plurality of lenses fastened in the lens tube 10a are coaxially disposed. In an implementation of this application, the plurality of lenses are fastened in the lens tube 10a, a distance between the lenses is fixed, and the optical lens 10 is a lens having a fixed focal length. In some other implementations of this application, the plurality of lenses of the optical lens 10 can move relatively in the lens tube 10a, to change a distance between the plurality of lenses. This can change a focal length of the optical lens 10, and implement focus adjustment of the optical lens 10. The infrared cut-off filter 30 may be fastened to an end that is of the lens tube 10a of the optical lens 10 and that faces an image side.

The camera module boo further includes structures such as a fixed holder (holder) 50 and a circuit board 60.

The fixed holder 50 includes an accommodating cavity. One end of the optical lens 10 is installed in the accommodating cavity of the fixed holder 50, and is fastened to a cavity wall of the accommodating cavity. The optical lens 10 is fastened relative to the fixed holder 50, and cannot move relative to the fixed holder 50. The circuit board 60 is fastened to a side that is of the fixed holder 50 and that is away from the optical lens bo. The circuit board 60 is configured to transmit an electrical signal. The circuit board 60 may be a flexible circuit board (flexible printed circuit, FPC) or a printed circuit board (printed circuit board, PCB). The FPC may be a single-sided flexible board, a double-sided flexible board, a multi-layer flexible board, a rigid-flexible board, a flexible circuit board with a hybrid structure, or the like. Other elements included in the camera module boo are not described in detail herein. The infrared cut-off filter 30 may be fastened to the cavity wall of the fixed holder 50, and is located between the optical lens 10 and the circuit board 60; or may be fastened above the circuit board 60 by using a support. The photosensitive element 20 is fastened to the circuit board 60 through bonding, surface mounting, or the like. In addition, the photosensitive element 20 is located on an image side of the optical lens 10 and is disposed opposite to the optical lens bo, and an optical image generated by the optical lens 10 can be projected onto the photosensitive element 20. In some implementations, the analog-to-digital converter 300, the image processor 200, the memory 400, and the like are also integrated on the circuit board 60 through bonding, surface mounting, or the like, to implement a communication connection between the photosensitive element 20, the analog-to-digital converter 300, the image processor 200, the memory 400, and the like by using the circuit board 60.

It may be understood that, in some other implementations of this application, one end of the optical lens 10 is installed in the accommodating cavity of the fixed holder 50 and can move relative to the fixed holder 50, to change a distance between the optical lens 10 and the photosensitive element 20, so as to ensure that when the plurality of lenses in the optical lens 10 move relatively to change the focal length of the optical lens bo, the optical lens 10 can always perform imaging on the photosensitive element 20. This ensures that the camera module boo can always have good imaging effect. Specifically, in some embodiments, an inner thread is disposed on the cavity wall of the accommodating cavity of the fixed holder 50, an outer thread is disposed on an outer wall of the lens tube 10a, and the lens tube 10a is connected to the fixed holder 50 in a threaded connection manner. The lens tube 10a is driven to rotate relative to the fixed holder 50, so that the lens tube 10a moves relative to the fixed holder 50 in an axial direction, and the lens of the optical lens 10 is close to or far away from the photosensitive element 20. It may be understood that the lens tube 10a may be further connected to the fixed holder 50 in another manner, and move relative to the fixed holder 50 (for example, the lens tube 10a is connected to the fixed holder 50 by using a guide rail). Details are not described herein.

Refer to FIG. 3 again. In this application, the optical lens 10 includes a first lens 11, a second lens 12, a third lens 13, a fourth lens 14, a fifth lens 15, a sixth lens 16, and a seventh lens 17 that are sequentially arranged from the object side to the image side. The first lens 11, the second lens 12, the third lens 13, the fourth lens 14, the fifth lens 15, the sixth lens 16, and the seventh lens 17 are all disposed coaxially. In this implementation of this application, each lens of the optical lens 10 is a lens having a positive focal power or a negative focal power, to ensure that each lens can achieve specific optical effect, so as to reduce a quantity of lenses of the optical lens 10 as much as possible and reduce a total track length of the optical lens 10 while ensuring optical effect of the optical lens 10 that needs to be achieved. Therefore, the optical lens 10 is miniaturized. When a plane mirror is inserted between the plurality of lenses, the plane mirror is not considered as a lens of the optical lens 10 in this application. For example, when a plane mirror is inserted between the fourth lens 14 and the fifth lens 15, the plane mirror cannot be considered as the fifth lens 15 in this implementation of this application.

Figure 5:
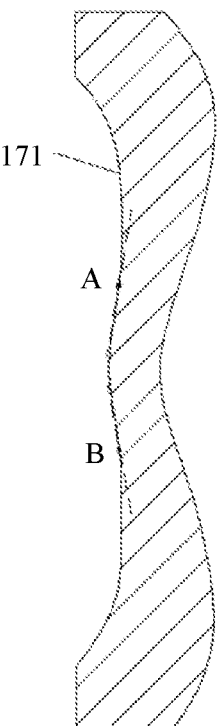
FIG. 5 is a schematic cross-sectional diagram of a seventh lens shown in FIG. 3.

In an implementation of this application, the lenses of the optical lens 10 can bring different optical performance, so that the lenses with different optical performance are combined to obtain the optical lens 10 having a large field of view and a small imaging distortion. In this implementation of this application, the first lens 11 is a lens bent towards the image side of the optical lens bo, and the first lens 11 has a negative focal power, so that a scene within a larger field of view range can enter the optical lens 10, and a field of view of the optical lens 10 is increased. The lens bent towards the image side of the optical lens 10 means that an edge of an object-side surface of the lens is closer to the image side of the optical lens 10 than a center of the object-side surface of the lens, and an edge of an image-side surface of the lens is closer to the image side of the optical lens 10 that a center of the image-side surface of the lens. In addition, in this implementation of this application, there is at least one inflection point on an object-side surface of the sixth lens 16 and/or an object-side surface of the seventh lens 17, so that the sixth lens 16 and/or the seventh lens 17 function/ functions well in adjusting an optical distortion and eliminating an aberration. This can reduce a distortion of the optical lens 10, and further ensure that the optical lens 10 can have a large field of view and a small distortion, to achieve good optical effect. It should be noted that the inflection point of the object-side surface described in this application is an inflection point on a contour line on which the object-side surface intersects with a plane passing through an axis of the lens. Therefore, the inflection point described in this application is a boundary point between a concave arc and a convex arc of the contour line on which the object-side surface intersects with the plane passing through the axis of the lens. For example, FIG. 5 is a schematic cross-sectional diagram of the seventh lens 17 shown in FIG. 3. FIG. 5 is obtained by cutting the seventh lens 17 along a plane passing through an axis of the seventh lens 17. Therefore, a free curve 171 in FIG. 5 is a contour line on which the object-side surface of the seventh lens 17 intersects with the plane passing through the axis of the seventh lens 17. In FIG. 5, there are two boundary points, namely a point A and a point B, between a concave arc and a convex arc on the free curve 171. In other words, there are two inflection points on the object-side surface of the seventh lens 17 in the implementation shown in FIG. 3.

In this implementation of this application, in the optical lens 10, FOV≥125°, and |DIST|≤40%. That is, the optical lens 10 in this implementation of this application has a large field of view and a small distortion.

In some implementations of this application, a combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In some implementations of this application, a focal length f1 of the first lens 11 of the optical lens 10 and a focal length f of the optical lens 10 satisfy: 1.5≤|f1/f|2. In this implementation of this application, a range of a ratio of the focal length f1 of the first lens 11 to the focal length f of the optical lens 10 is limited, and a focal power of the first lens 11 can be properly allocated, so that the first lens 11 can better increase the field of view, and better coordinate with another lens to correct an aberration of the optical lens 10. This reduces a distortion, and improves imaging quality of the optical lens 10.

In some implementations, there is at least one inflection point on an object-side surface of the first lens 11. This can effectively increase an optical incident angle of the optical lens 10, and further increase the field of view of the optical lens 10. In addition, the first lens 11 having at least one inflection point on the object-side surface can have good distortion correction effect, to further reduce the distortion of the optical lens 10 and improve the optical effect of the optical lens 10.

In some implementations, a diameter D1 of the first lens 11 of the optical lens 10 and an image height IMH of an image taken by the optical lens 10 meet a relationship: 0.5≤|D1/IMH|≤1.5. In this implementation of this application, the diameter D1 of the first lens 11 and an image height IMH of an image taken by the optical lens 10 meet the foregoing relationship. To be specific, it can be ensured that the diameter of the first lens is close to the image height of the image taken by the optical lens 10. This avoids an excessively small diameter of the first lens, and further ensures that the optical lens 10 has a large field of view. In addition, this can avoid an excessively small image height of the image taken by the optical lens 10, and further ensure that the optical lens 10 has a high modulation transfer function.

In some implementations, a focal length f7 of the seventh lens 17 of the optical lens 10 and the focal length f of the optical lens 10 satisfy: 2.5≤|f7/f|≤4. In this implementation of this application, when the focal length of the seventh lens 17 and the focal length of the optical lens 10 meet the foregoing relationship, the focal power of the seventh lens 17 can be properly allocated, to better coordinate with another lens to correct an aberration of the optical lens 10. This reduces a distortion, and improves imaging quality of the optical lens 10.

In some implementations, the fourth lens 14 and the seventh lens 17 each have a negative focal power. In this implementation of this application, the fourth lens 14 and the seventh lens 17 each have the negative focal power, and can diffuse light, to ensure that the optical lens 10 has a large image height, so that the optical lens 10 can match a photosensitive element with a maximum chief ray angle, and a modulation transfer function of the optical lens 10 is improved. In addition, the fourth lens 14 and the seventh lens 17 can coordinate with another lens to correct a chromatic aberration and a distortion of the optical lens 10, so that the optical lens 10 can achieve better optical effect.

In some implementations, the aperture F-number (F #) of the optical lens 10 meets a relationship: 1.5≤F #≤2.8. In this implementation of this application, when the aperture F-number of the optical lens 10 meets the foregoing relationship, the optical lens 10 can have sufficient incident light, thereby ensuring that the image taken by the optical lens 10 can have good optical effect.

In some implementations, a total track length TTL of the optical lens 10 and the image height IMH of an image taken by the optical lens 10 meet a relationship: 0.8≤|TTL/ IMH|≤1.5. In this implementation of this application, when the total track length TTL of the optical lens 10 and the image height IMH of the image taken by the optical lens 10 meet the foregoing relationship, it can be ensured that the optical lens 10 has a high modulation transfer function and the lenses of the optical lens 10 can be arranged more compactly. Therefore, an optical length of the optical lens 10 can be small, and the optical lens 10 can be miniaturized, to facilitate use in the small electronic device 1000.

In some implementations, the focal length f of the optical lens 10 and the total track length TTL of the optical lens 10 meet a relationship: 0.1≤|f/TTL|≤0.4. When the focal length f and the total track length TTL of the optical lens 10 meet the foregoing relationship, it can be ensured that the lenses of the optical lens 10 can be arranged more compactly and a distance between the lens of the optical lens 10 and an imaging plane can be small, to ensure that the total track length of the optical lens 10 can be small. Therefore, the optical lens 10 can be miniaturized, to facilitate use in the small electronic device 1000.

In some implementations of this application, the lenses of the optical lens 10 may be made of a plastic material, a glass material, or another composite material. Various optical lens structures with complex shapes can be easily made of the plastic material. A refractive index n1 of a glass lens satisfies: 1.50≤n1≤1.90. The refractive index can be selected from a larger range than a refractive index of a plastic lens with a range (1.55 to 1.65). Therefore, a glass lens that is thin but better in performance is more easily obtained. This helps reduce on-axis thicknesses of a plurality of lenses of the optical lens 10, and an optical lens structure with a complex shape is not easily produced. Therefore, in some implementations of this application, production costs, efficiency, and optical effect are considered, and specific application materials for different lenses are properly used based on a requirement.

The following describes some specific but non-limitative examples in implementations of this application in more detail with reference to FIG. 6 to FIG. 29.

Figure 6:
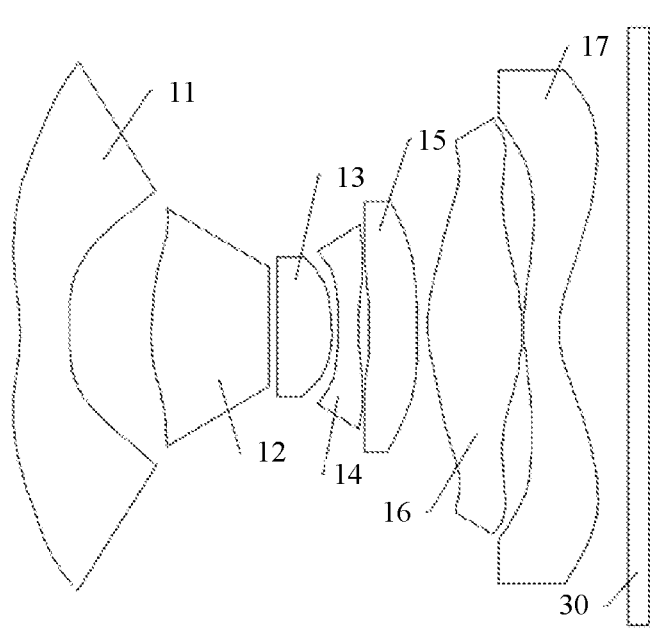
FIG. 6 is a schematic cross-sectional diagram of a plurality of lenses of an optical lens according to a first implementation of this application.

FIG. 6 is a schematic cross-sectional diagram of a plurality of lenses of the optical lens 10 according to a first implementation of this application. In this implementation, the optical lens 10 includes seven lenses: a first lens 11, a second lens 12, a third lens 13, a fourth lens 14, a fifth lens 15, a sixth lens 16, and a seventh lens 17. The first lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a negative focal power, the fifth lens 15 has a negative focal power, the sixth lens 16 has a positive focal power, and the seventh lens 17 has a negative focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the first implementation of this application are shown in Table 1.

TABLE 1

| Design parameters of the optical lens 10 in the first implementation | | | | | | | |
|---|---|---|---|---|---|---|---|
| Surface number | Surface type | Curvature radius | Thickness | Refractive index | Abbe number | Focal length | Conic coefficient |
| S1 | Aspheric surface | −1.8759 | 0.5000 | 1.5459 | 56.1354 | −2.287 | −1.0000 |
| S2 | Aspheric surface | 4.0860 | 0.8656 | | | | |
| S3 | Aspheric surface | 2.6572 | 1.2000 | 1.6446 | 23.5412 | 4.168 | |
| S4 | Aspheric surface | 198.8034 | 0.0739 | | | | |
| S5 | Aspheric surface | 12.9313 | 0.5678 | 1.5459 | 56.1354 | 2.675 | |
| S6 | Aspheric surface | −1.6205 | 0.0614 | | | | |
| S7 | Aspheric surface | 23.8691 | 0.2300 | 1.6776 | 19.2459 | −7.730 | |
| S8 | Aspheric surface | 4.2788 | 0.1072 | | | | |
| S9 | Aspheric surface | −2.3403 | 0.4982 | 1.5704 | 37.3165 | −3.955 | |
| S10 | Aspheric surface | 67.4063 | 0.1046 | | | | |
| S11 | Aspheric surface | 1.3464 | 0.9606 | 1.5459 | 56.1354 | 1.650 | −1.0000 |
| S12 | Aspheric surface | −2.0364 | 0.0300 | | | | −1.0000 |
| S13 | Aspheric surface | 1.6218 | 0.3600 | 1.6669 | 20.3532 | −3.948 | −27.5500 |
| S14 | Aspheric surface | 0.9145 | 0.7264 | | | | −5.0458 |
| S15 | Spheric surface | Infinity | 0.2100 | 1.5183 | 64.1664 | | |
| S16 | Spheric surface | Infinity | 0.3099 | | | | |

S1 represents an object-side surface of the first lens 11, S2 represents an image-side surface of the first lens 11, S3 represents an object-side surface of the second lens 12, S4 represents an image-side surface of the second lens 12, S5 represents an object-side surface of the third lens 13, S6 represents an image-side surface of the third lens 13, S7 represents an object-side surface of the fourth lens 14, S8 represents an image-side surface of the fourth lens 14, S9 represents an object-side surface of the fifth lens 15, S10 represents an image-side surface of the fifth lens 15, S11 represents an object-side surface of the sixth lens 16, S12 represents an image-side surface of the sixth lens 16, S13 represents an object-side surface of the seventh lens 17, S14 represents an image-side surface of the seventh lens 17, S15 represents an object-side surface of the optical filter 30, and S16 represents an image-side surface of the optical filter 30. It should be noted that, in this application, symbols such as S1, S2, S3, S4, S5, S6, S7, S8, S9, S10, S11, S12, S13, S14, S15 and S16 represent same meanings, and details are not described again when the symbols appear below again.

In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In this implementation, there is at least one inflection point on each of the object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of the object-side surfaces and the image-side surfaces of the lenses of the optical lens 10 are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 2 shows aspheric coefficients of the optical lens boo in Embodiment 1 of this application.

TABLE 2

| Aspheric coefficients of the lenses of the optical lens 10 in Embodiment 1 | | | | | | |
|---|---|---|---|---|---|---|
| Surface number | A4 | A6 | A8 | A10 | A12 | A14 | A16 |
| S1 | 4.748E−01 | −5.565E−01 | 5.451E−01 | −4.114E−01 | 2.329E−01 | −9.859E−02 | 3.124E−02 |
| S2 | 3.936E−01 | 1.014E+00 | −7.449E+00 | 2.545E+01 | −5.562E+01 | 8.273E+01 | −8.500E+01 |
| S3 | −2.091E−02 | −3.977E−02 | −2.585E−02 | 8.809E−02 | −1.574E−01 | 1.679E−01 | −1.001E−01 |
| S4 | −3.304E−02 | 7.742E−01 | −1.425E+01 | 1.623E+02 | −1.106E+03 | 4.585E+03 | −1.129E+04 |
| S5 | −4.369E−02 | 5.921E−02 | 1.674E+01 | −3.944E+02 | 4.088E+03 | −2.341E+04 | 7.639E+04 |
| S6 | −4.853E−01 | 3.946E−01 | 8.163E+00 | −7.056E+01 | 2.849E+02 | −6.958E+02 | 1.026E+03 |
| S7 | −7.968E−01 | 1.293E+00 | −6.037E+00 | 3.409E+01 | −1.293E+02 | 2.861E+02 | −3.660E+02 |
| S8 | −5.673E−02 | −7.034E−01 | 2.607E+00 | −5.069E+00 | 6.108E+00 | −4.600E+00 | 2.023E+00 |
| S9 | 4.275E−01 | −2.288E−01 | −1.365E+00 | 4.711E+00 | −7.722E+00 | 7.578E+00 | −4.539E+00 |
| S10 | −5.626E−01 | 1.287E+00 | −2.355E+00 | 3.249E+00 | −3.356E+00 | 2.473E+00 | −1.206E+00 |
| S11 | −5.451E−01 | 1.072E+00 | −1.892E+00 | 2.604E+00 | −2.636E+00 | 1.934E+00 | −1.019E+00 |
| S12 | 1.239E−01 | −7.471E−02 | −5.744E−02 | 2.019E−01 | −1.882E−01 | 9.186E−02 | −2.653E−02 |
| S13 | 7.829E−02 | −7.511E−01 | 1.947E+00 | −3.252E+00 | 3.822E+00 | −3.214E+00 | 1.950E+00 |
| S14 | −1.692E−01 | 2.521E−01 | −3.076E−01 | 2.770E−01 | −1.764E−01 | 7.889E−02 | −2.472E−02 |

| Surface number | A18 | A20 | A22 | A24 | A26 | A28 | A30 |
|---|---|---|---|---|---|---|---|
| S1 | −7.404E−03 | 1.303E−03 | −1.677E−04 | 1.531E−05 | −9.377E−07 | 3.456E−08 | −5.787E−10 |
| S2 | 5.928E+01 | −2.616E+01 | 5.505E+00 | 7.885E−01 | −8.398E−01 | 2.122E−01 | −1.964E−02 |
| S3 | 3.225E−02 | −4.534E−03 | 0.000E+00 | 0.000E+00 | 0.000E+00 | 0.000E+00 | 0.000E+00 |
| S4 | 1.515E+04 | −8.530E+03 | 0.000E+00 | 0.000E+00 | 0.000E+00 | 0.000E+00 | 0.000E+00 |
| S5 | −1.332E+05 | 9.633E+04 | 0.000E+00 | 0.000E+00 | 0.000E+00 | 0.000E+00 | 0.000E+00 |
| S6 | −8.324E+02 | 2.780E+02 | 0.000E+00 | 0.000E+00 | 0.000E+00 | 0.000E+00 | 0.000E+00 |
| S7 | 2.471E+02 | −6.497E+01 | 0.000E+00 | 0.000E+00 | 0.000E+00 | 0.000E+00 | 0.000E+00 |
| S8 | −4.271E−01 | 2.055E−02 | 0.000E+00 | 0.000E+00 | 0.000E+00 | 0.000E+00 | 0.000E+00 |
| S9 | 1.539E+00 | −2.275E−01 | 0.000E+00 | 0.000E+00 | 0.000E+00 | 0.000E+00 | 0.000E+00 |
| S10 | 3.451E−01 | −4.352E−02 | 0.000E+00 | 0.000E+00 | 0.000E+00 | 0.000E+00 | 0.000E+00 |
| S11 | 3.776E−01 | −9.324E−02 | 1.320E−02 | −3.515E−04 | −2.166E−04 | 3.534E−05 | −1.829E−06 |
| S12 | 4.577E−03 | −4.371E−04 | 1.781E−05 | 0.000E+00 | 0.000E+00 | 0.000E+00 | 0.000E+00 |
| S13 | −8.584E−01 | 2.736E−01 | −6.243E−02 | 9.929E−03 | −1.044E−03 | 6.526E−05 | −1.833E−06 |
| S14 | 5.363E−03 | −7.752E−04 | 6.692E−05 | −2.053E−06 | −1.895E−07 | 2.111E−08 | −6.324E−10 | lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the A4, A6, A8, A10, A12, A14, A16, A20, A22, A24, A26, A28, and A30 are aspheric coefficients. It should be noted that, in this application, symbols such as A4, A6, A8, A10, A12, A14, A16, A20, A22, A24, A26, A28, and A30 represent same meanings, and details are not described again when the symbols appear below again. It should be noted that each parameter in the table is represented through scientific notation. For example, 4.748E–01 indicates $4.748 \times 10^{-1}$, and –6.324E–10 indicates $-6.324 \times 10^{-1}$.

In this embodiment, all lenses with the aspheric surfaces satisfy the following formula:

$$z = \frac{cr^2}{1 + \sqrt{1 - Kc^2 r^2}} + A_2 r^2 + A_4 r^4 + \ldots + A_{26} r^{26} + A_{28} r^{28} + A_{30} r^{30}$$

z is a vector height of an aspheric surface, r is a radial coordinate of the aspheric surface, c is a spherical curvature of a vertex on the aspheric surface, K is a conic constant, and $A_2$, $A_4$, $A_6$, $A_8$, $A_{10}$, . . . , $A_{26}$, $A_{28}$, and $A_{30}$ are aspheric coefficients.

The parameters in Table 2 are substituted into the foregoing formula, so that the lenses of the optical lens 10 in this implementation can be designed. The lenses of the optical lens 10 in this implementation are designed based on the parameters in Table 1 and Table 2, so that the optical lens 10 in this implementation can have basic parameters shown in Table 3.

TABLE 3

| Basic parameters of the optical lens 10 in the first implementation | | | |
|---|---|---|---|
| \|f1/f \| | 1.575 | f(mm) | 1.453 |
| \|f2/f\| | 2.87 | TTL(mm) | 6.810 |
| \|f3/f\| | 1.842 | IMH(mm) | 6.559 |
| \|f4/f\| | 5.322 | FOV(°) | 140° |
| \|f5/f\| | 2.723 | F# | 2.193 |
| \|f6/f\| | 1.136 | \|DIST\| | 17.6% |
| \|f7/f\| | 2.718 | D1 | 5.470 | f1 represents a focal length of the first lens 11, f2 represents a focal length of the second lens 12, f3 represents a focal length of the third lens 13, f4 represents a focal length of the fourth lens 14, f5 represents a focal length of the fifth lens 15, f6 represents a focal length of the sixth lens 16, f7 represents a focal length of the seventh lens 17, f represents a focal length of the optical lens 10, TTL represents a total track length of the optical lens 10, IMH represents a diagonal length of an effective pixel region on the photosensitive element 20, FOV represents a field of view of the optical lens 10, F # represents an aperture F-number of the optical lens 10, DIST represents a maximum optical distortion of the optical lens 10 within a full field of view range, and D1 represents a diameter of the first lens 11. It should be noted that, in this application, symbols such as f1, f2, f3, f4, f5, f6, f7, f, TTL, FOV, IMH, DIST, and D1 represent same meanings, and details are not described again when the symbols appear below again.

It can be learned from the basic parameters of the optical lens 10 that, in this implementation, |f1/f|=1.575; |f2/f|=2.87; |f3/f|=1.842; |f4/f|=5.322; |f5/f|=2.723; |f6/f|=1.136; and |f7/f|=2.718. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, the total track length of the optical lens 10 can be reduced as much as possible, to miniaturize the optical lens 10.

In this embodiment, a maximum field of view of the optical lens 10 is 140°, and the maximum optical distortion |DIST| (unit: %)=17.6% is ensured within the full field of view range. Compared with a common optical lens 10, the optical lens 10 in this implementation can have a large field of view and a small optical distortion, to achieve good imaging effect.

An aperture value F # of the optical lens 10 in this implementation is 2.193, that is, the aperture value F # of the optical lens 10 in this implementation is small, so that the optical lens 10 can be used better under low illumination.

In this implementation, a ratio of the diameter D1 of the first lens 11 to the diagonal length of the effective pixel region on an imaging plane of the optical lens 10 is |D1/IMH|=0.839. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is |TTL/IMH|=1.038. In this implementation, the total track length TTL of the optical lens 10 is basically the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of the focal length f of the optical lens 10 to the total track length TTL of the optical lens 10 is |f/TTL|=0.213. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 7:
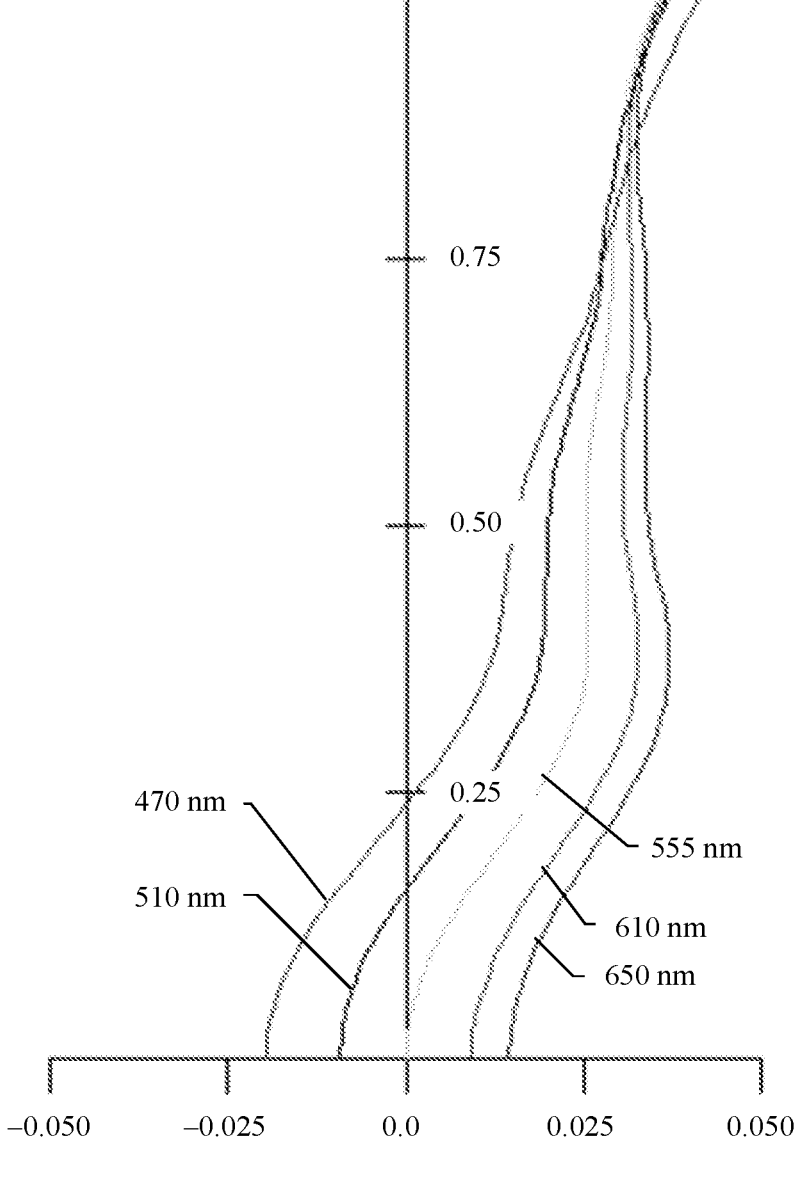
FIG. 7 is a diagram of spherical aberrations obtained after light with wavelengths of 650 nm, 610 nm, 555 nm, 510 nm, and 470 nm passes through an optical lens according to Embodiment 1.
Figure 8:
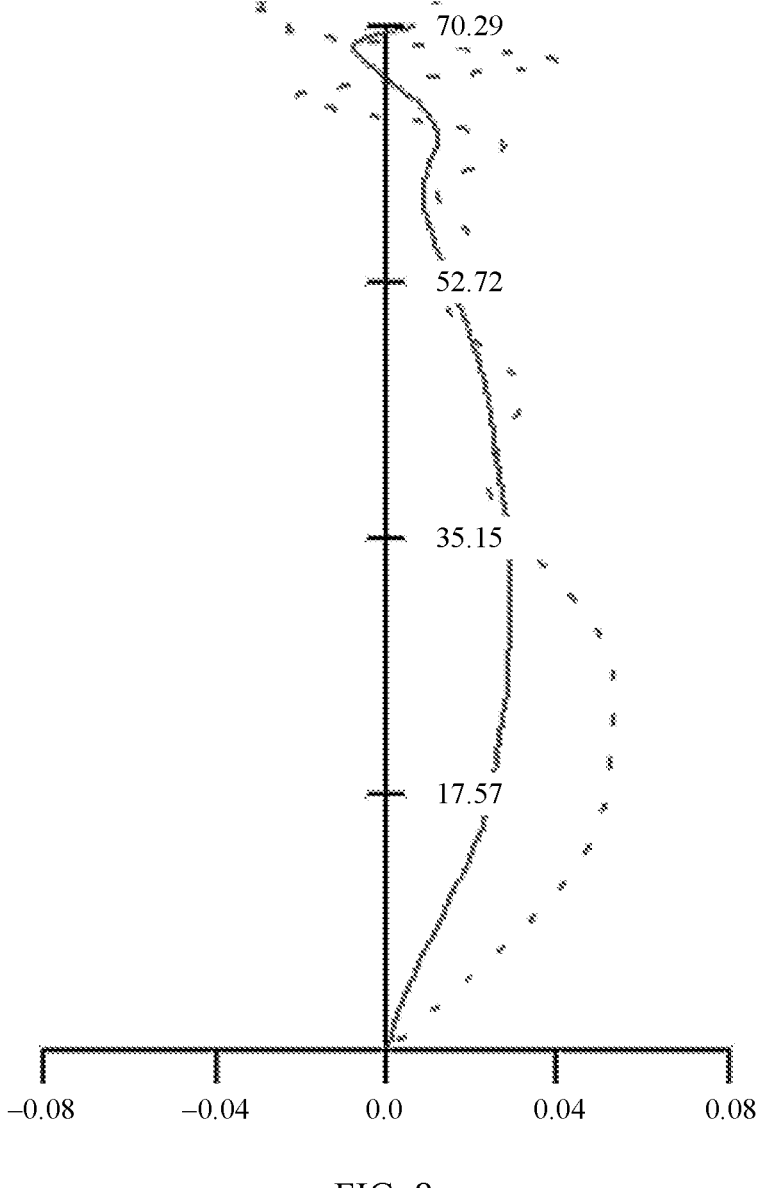
FIG. 8 is a diagram of astigmatism and field curvature that are obtained after light with a wavelength of 555 nm passes through an optical lens according to Embodiment 1.
Figure 9:
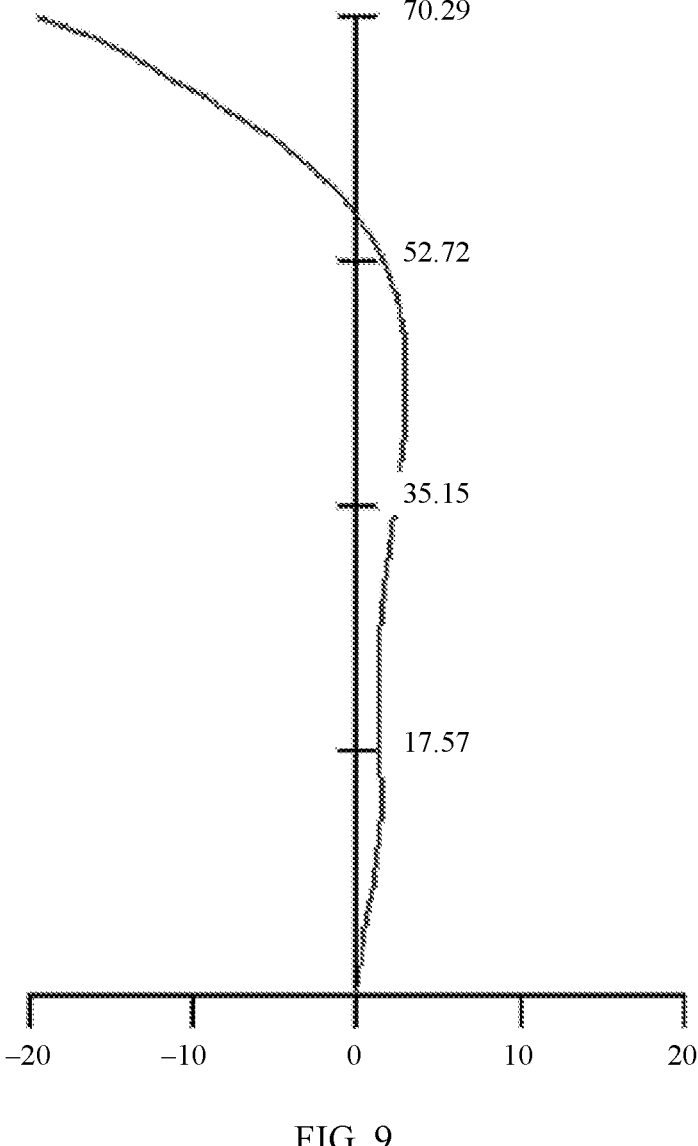
FIG. 9 is a diagram of a distortion obtained after light with a wavelength of 555 nm passes through an optical lens according to Embodiment 1.

FIG. 7 to FIG. 9 are diagrams representing optical performance of the optical lens 10 according to Embodiment 1.

Specifically, FIG. 7 is a diagram of spherical aberrations obtained after light with wavelengths of 650 nm, 610 nm, 555 nm, 510 nm, and 470 nm passes through the optical lens 10 according to Embodiment 1. In FIG. 7, a vertical coordinate represents normalized pupil coordinates, and a horizontal coordinate represents spherical aberration values in a unit of millimeter. It can be learned from FIG. 7 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 8 is a diagram of astigmatism and field curvature that are obtained after the light with the wavelength of 555 nm passes through the optical lens 10 according to Embodiment 1. In FIG. 8, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 9 is a diagram of a distortion obtained after the light with the wavelength of 555 nm passes through the optical lens 10 according to Embodiment 1. In FIG. 9, a vertical coordinate represents a field of view in a unit of degree (°), and a horizontal coordinate represents a distortion value, in lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a positive focal power, the fifth lens 15 has a negative focal power, the sixth lens 16 has a positive focal power, and the seventh lens 17 has a positive focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the second implementation of this application are shown in Table 4.

TABLE 4

| Surface number | Surface type | Curvature radius | Thickness | Refractive index | Abbe number | Focal length | Conic coefficient |
|---|---|---|---|---|---|---|---|
| | | Design parameters of the optical lens 10 in the second implementation | | | | | |
| S1 | Aspheric surface | 16.6058 | 0.3138 | 1.5463 | 55.9861 | −2.006 | 5.7593 |
| S2 | Aspheric surface | 1.0213 | 0.5697 | | | | −0.9491 |
| S3 | Aspheric surface | 2.5750 | 0.8296 | 1.6563 | 21.5228 | 4.527 | 0.3634 |
| S4 | Aspheric surface | 16.8380 | 0.4540 | | | | −41.6851 |
| S5 | Aspheric surface | −3.7842 | 0.3863 | 1.5463 | 55.9861 | 8.028 | 9.2231 |
| S6 | Aspheric surface | −2.1047 | 0.0873 | | | | −13.6914 |
| S7 | Aspheric surface | 4.5894 | 1.0181 | 1.5463 | 55.9861 | 1.632 | 20.7521 |
| S8 | Aspheric surface | −1.0195 | 0.1101 | | | | −1.4190 |
| S9 | Aspheric surface | −1.4672 | 0.2858 | 1.6499 | 22.4774 | −1.578 | −1.3091 |
| S10 | Aspheric surface | 3.6638 | 0.1173 | | | | −1.4678 |
| S11 | Aspheric surface | −25.9375 | 0.6624 | 1.5463 | 55.9861 | 2.708 | 72.9444 |
| S12 | Aspheric surface | −1.4121 | 0.0611 | | | | −0.3384 |
| S13 | Aspheric surface | 1.9601 | 0.7464 | 1.5463 | 55.9861 | 11.886 | −0.3030 |
| S14 | Aspheric surface | 2.4300 | 0.4221 | | | | −0.1011 |
| S15 | Spheric surface | Infinity | 0.2100 | 1.5183 | 64.1664 | | |
| S16 | Spheric surface | Infinity | 0.5152 | | | | | a unit of %, obtained after the light with the wavelength of 555 nm passes through the optical lens 10 in Embodiment 1. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

Figure 10:
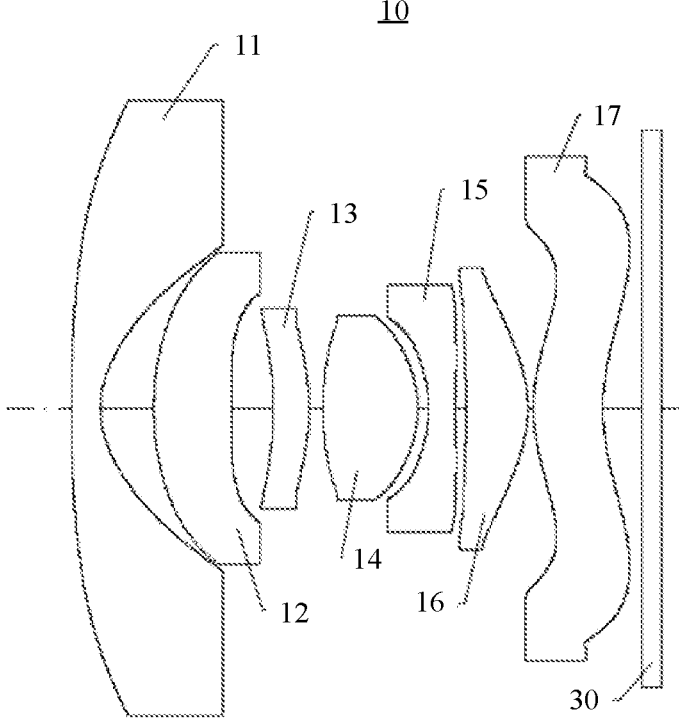
FIG. 10 is a schematic cross-sectional diagram of a plurality of lenses of an optical lens according to a second implementation of this application.

FIG. 10 is a schematic cross-sectional diagram of a plurality of lenses of the optical lens 10 according to a second implementation of this application. In this implementation, the optical lens 10 includes seven lenses: a first lens 11, a second lens 12, a third lens 13, a fourth lens 14, a fifth lens 15, a sixth lens 16, and a seventh lens 17. The first In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved.

In this implementation, there is at least one inflection point on each of object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of object-side surfaces and image-side surfaces of the lenses of the optical lens 10 are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 5 shows aspheric coefficients of the optical lens 100 in the second implementation of this application.

In this embodiment, all lenses with the aspheric surfaces satisfy the following formula:

$$z = \frac{cr^2}{1 + \sqrt{1 - Kc^2r^2}} + A_2r^2 + A_4r^4 + \ldots + A_{26}r^{26} + A_{28}r^{28} + A_{30}r^{30}$$

z is a vector height of an aspheric surface, r is a radial coordinate of the aspheric surface, c is a spherical curvature of a vertex on the aspheric surface, K is a conic constant, and A2, A4, A6, A8, A10, . . . , A26, A28, and A30 are aspheric coefficients.

The parameters in Table 5 are substituted into the foregoing formula, so that the lenses of the optical lens 10 in this implementation can be designed. The lenses of the optical lens 10 in this implementation are designed based on the parameters in Table 4 and Table 5, so that the optical lens 10 in this implementation can have basic parameters shown in Table 6.

TABLE 6

| Basic parameters of the optical lens 10 in the second implementation | | | |
|---|---|---|---|
| \|f1/f \| | 1.478 | f(mm) | 1.357 |
| \|f2/f\| | 3.335 | TTL(mm) | 6.851 |

TABLE 5

| Aspheric coefficients of the lenses of the optical lens 10 in the second implementation | | | | | | | |
|---|---|---|---|---|---|---|---|
| Surface number | A4 | A6 | A8 | A10 | A12 | A14 | A16 |
| S1 | 1.304E−03 | 2.520E−04 | −1.663E−05 | 5.055E−08 | 2.762E−09 | 0.000E+00 | 0.000E+00 |
| S2 | −7.015E−02 | −3.080E−03 | 9.631E−02 | −1.862E−01 | 2.079E−01 | −1.412E−01 | 5.856E−02 |
| S3 | −5.128E−02 | 4.046E−02 | 1.918E−03 | −2.817E−02 | 3.976E−02 | −3.426E−02 | 1.797E−02 |
| S4 | 4.612E−02 | 8.374E−02 | −8.167E−02 | 3.965E−02 | 4.789E−05 | −9.459E−04 | −4.635E−05 |
| S5 | 3.969E−02 | −9.866E−02 | 4.328E−01 | −1.249E+00 | 3.060E+00 | −5.343E+00 | 6.034E+00 |
| S6 | 1.555E−02 | −3.218E−01 | 1.655E+00 | −4.444E+00 | 7.218E+00 | −7.488E+00 | 5.645E+00 |
| S7 | 1.490E−01 | −4.163E−02 | −1.546E+00 | 6.772E+00 | −1.241E+01 | −8.170E−01 | 4.662E+01 |
| S8 | 3.133E−01 | −9.965E−01 | 4.011E+00 | −1.413E+01 | 3.026E+01 | −4.076E+01 | 3.517E+01 |
| S9 | −1.610E−01 | 1.393E+00 | −6.059E+00 | 1.937E+01 | −4.881E+01 | 8.360E+01 | −9.082E+01 |
| S10 | −6.040E−01 | 1.550E+00 | −2.681E+00 | 3.291E+00 | −3.001E+00 | 2.036E+00 | −9.848E−01 |
| S11 | −1.413E−01 | 3.767E−01 | −4.364E−01 | 2.522E−01 | −5.410E−02 | −1.481E−02 | 5.870E−03 |
| S12 | 1.065E−01 | 1.213E−02 | −1.210E−02 | 2.961E−04 | 1.208E−03 | 6.347E−05 | 1.360E−05 |
| S13 | −6.628E−02 | −1.835E−02 | 1.043E−02 | −2.211E−03 | −2.448E−04 | 8.491E−05 | 3.283E−07 |
| S14 | −3.490E−02 | −1.746E−02 | 9.173E−03 | −2.292E−03 | 2.777E−04 | −1.387E−05 | −8.031E−08 |

| Surface number | A18 | A20 | A22 | A24 | A26 | A28 | A30 |
|---|---|---|---|---|---|---|---|
| S1 | 0.000E+00 | 0.000E+00 | 0.000E+00 | 0.000E+00 | 0.000E+00 | 0.000E+00 | 0.000E+00 |
| S2 | −1.446E−02 | 1.949E−03 | −1.102E−04 | 0.000E+00 | 0.000E+00 | 0.000E+00 | 0.000E+00 |
| S3 | −5.489E−03 | 8.962E−04 | −6.061E−05 | 0.000E+00 | 0.000E+00 | 0.000E+00 | 0.000E+00 |
| S4 | 0.000E+00 | 0.000E+00 | 0.000E+00 | 0.000E+00 | 0.000E+00 | 0.000E+00 | 0.000E+00 |
| S5 | −4.142E+00 | 1.567E+00 | −2.498E−01 | 0.000E+00 | 0.000E+00 | 0.000E+00 | 0.000E+00 |
| S6 | −3.782E+00 | 2.064E+00 | −5.457E−01 | 0.000E+00 | 0.000E+00 | 0.000E+00 | 0.000E+00 |
| S7 | −8.675E+01 | 6.915E+01 | −2.124E+01 | 0.000E+00 | 0.000E+00 | 0.000E+00 | 0.000E+00 |
| S8 | −1.894E+01 | 5.820E+00 | −7.810E−01 | 0.000E+00 | 0.000E+00 | 0.000E+00 | 0.000E+00 |

| Surface number | A4 | A6 | A8 | A10 | A12 | A14 | A16 |
|---|---|---|---|---|---|---|---|
| S9 | 5.914E+01 | −2.079E+01 | 2.988E+00 | 0.000E+00 | 0.000E+00 | 0.000E+00 | 0.000E+00 |
| S10 | 3.146E−01 | −5.857E−02 | 4.774E−03 | 0.000E+00 | 0.000E+00 | 0.000E+00 | 0.000E+00 |
| S11 | 4.190E−03 | −2.732E−03 | 4.507E−04 | 0.000E+00 | 0.000E+00 | 0.000E+00 | 0.000E+00 |
| S12 | 7.385E−07 | 1.887E−07 | 0.000E+00 | 0.000E+00 | 0.000E+00 | 0.000E+00 | 0.000E+00 |
| S13 | 0.000E+00 | 0.000E+00 | 0.000E+00 | 0.000E+00 | 0.000E+00 | 0.000E+00 | 0.000E+00 |
| S14 | 0.000E+00 | 0.000E+00 | 0.000E+00 | 0.000E+00 | 0.000E+00 | 0.000E+00 | 0.000E+00 |

TABLE 6-continued

| Basic parameters of the optical lens 10 in the second implementation | | | |
|---|---|---|---|
| \|f3/f\| | 5.914 | IMH(mm) | 6.683 |
| \|f4/f\| | 1.202 | FOV(°) | 143.6° |
| \|f5/f\| | 1.162 | F# | 2 |
| \|f6/f\| | 1.995 | \|DIST\| | 19.6% |
| \|f7/f\| | 8.757 | D1 | 6.420 | f1 represents a focal length of the first lens 11, f2 represents a focal length of the second lens 12, f3 represents a focal length of the third lens 13, f4 represents a focal length of the fourth lens 14, f5 represents a focal length of the fifth lens 15, f6 represents a focal length of the sixth lens 16, f7 represents a focal length of the seventh lens 17, f represents a focal length of the optical lens 10, TTL represents a total track length of the optical lens 10, IMH represents a diagonal length of an effective pixel region on the photosensitive element 20, FOV represents a field of view of the optical lens 10, F # represents an aperture F-number of the optical lens 10, DIST represents a maximum optical distortion of the optical lens 10 within a full field of view range, and D1 represents a diameter of the first lens 11. It should be noted that, in this application, symbols such as f1, f2, f3, f4, f5, f6, f7, f, TTL, FOV, IMH, DIST, and D1 represent same meanings, and details are not described again when the symbols appear below again.

It can be learned from the basic parameters of the optical lens 10 that, in this implementation, \|f1/f\|=1.478; \|f2/f\|=3.335; \|f3/f\|=5.914; \|f4/f\|=1.202; \|f5/f\|=1.162; \|f6/f\|=1.995; and \|f7/f\|=8.757. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, the total track length of the optical lens 10 can be reduced as much as possible, to miniaturize the optical lens 10.

In this embodiment, a maximum field of view of the optical lens 10 is 143.6°, and the maximum optical distortion \|DIST\| (unit: %)=19.6% is ensured within the full field of view range. Compared with a common optical lens 10, the optical lens 10 in this implementation can have a large field of view and a small optical distortion, to achieve good imaging effect.

An aperture value F # of the optical lens 10 in this implementation is 2, that is, the aperture value F # of the optical lens 10 in this implementation is small, so that the optical lens 10 can be used better under low illumination.

In this implementation, a ratio of the diameter D1 of the first lens 11 to the diagonal length of the effective pixel region on an imaging plane of the optical lens 10 is \|D1/IMH\|=0.961. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is \|TTL/IMH\|=1.025. In this implementation, the total track length TTL of the optical lens 10 is basically the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of the focal length f of the optical lens 10 to the total track length TTL of the optical lens 10 is \|f/TTL\|=0.198. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 11:
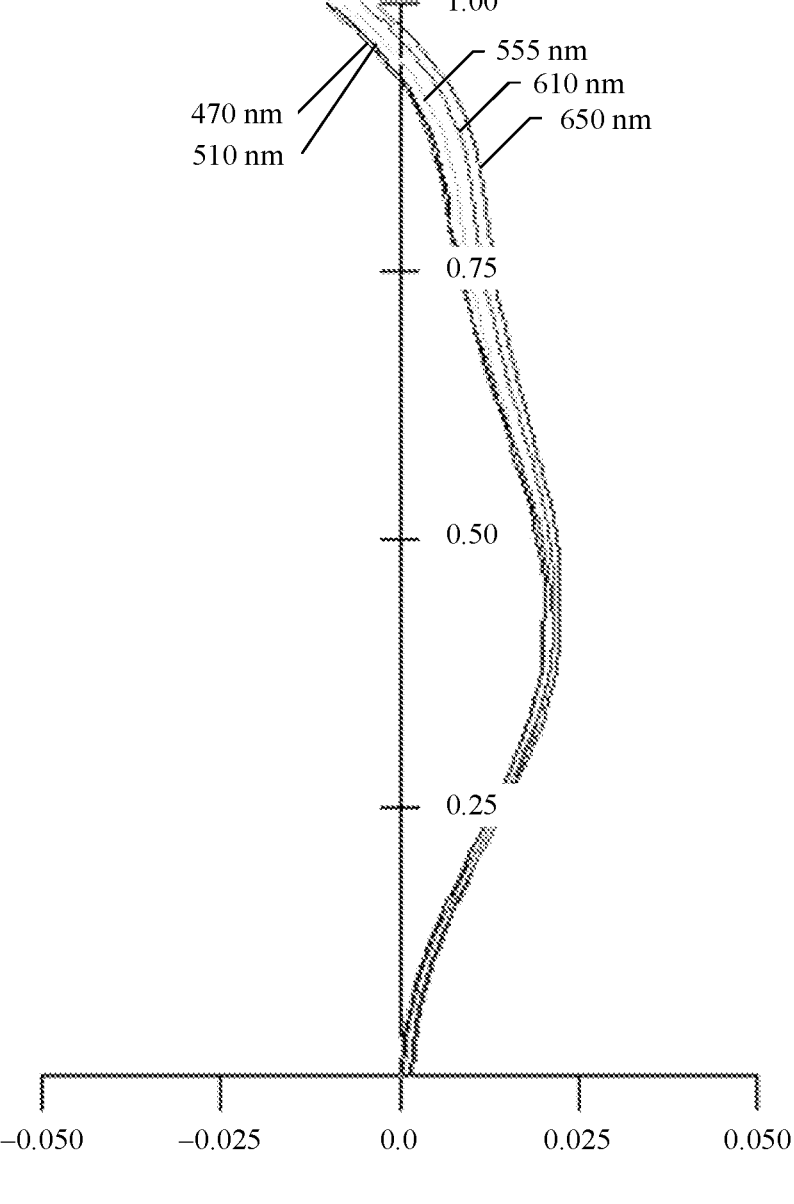
FIG. 11 is a diagram of spherical aberrations obtained after light with wavelengths of 650 nm, 610 nm, 555 nm, 510 nm, and 470 nm passes through an optical lens according to Embodiment 2.
Figure 12:
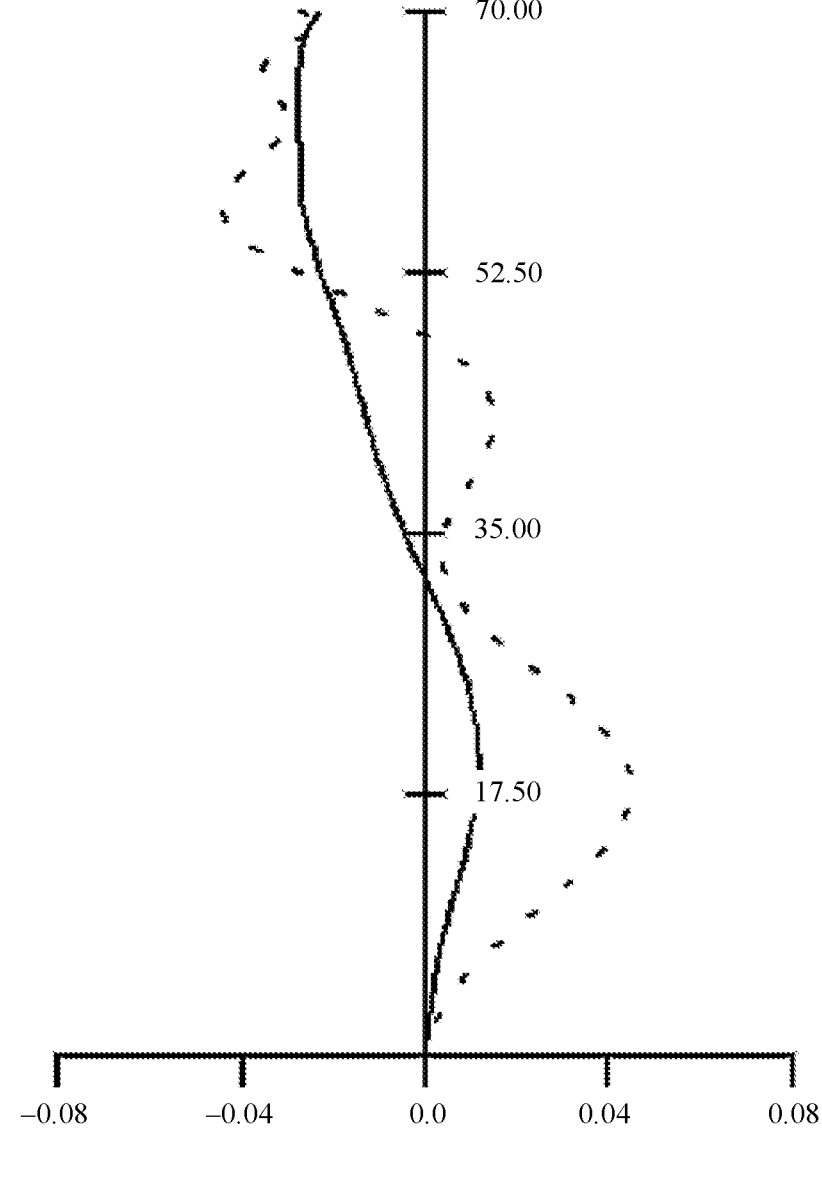
FIG. 12 is a diagram of astigmatism and field curvature that are obtained after light with a wavelength of 555 nm passes through an optical lens according to Embodiment 2.
Figure 13:
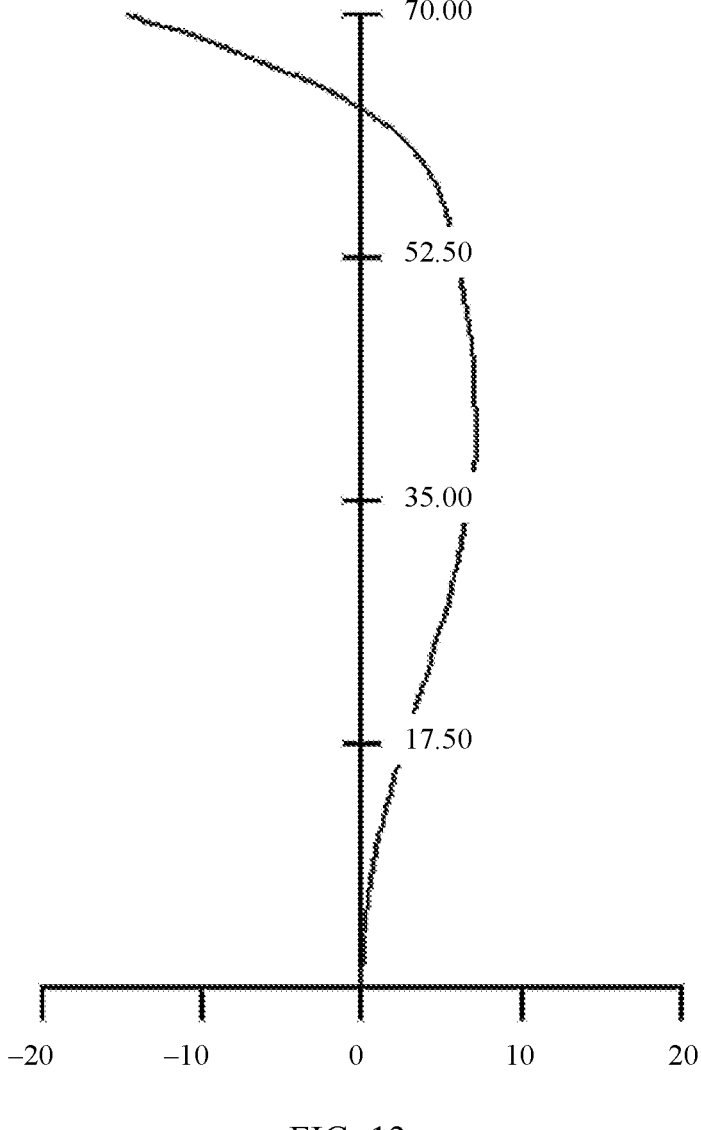
FIG. 13 is a diagram of a distortion obtained after light with a wavelength of 555 nm passes through an optical lens according to Embodiment 2.

FIG. 11 to FIG. 13 are diagrams representing optical performance of the optical lens 10 according to the second implementation.

Specifically, FIG. 11 is a diagram of spherical aberrations obtained after light with wavelengths of 650 nm, 610 nm, 555 nm, 510 nm, and 470 nm passes through the optical lens 10 according to the second implementation. In FIG. 11, a vertical coordinate represents normalized pupil coordinates, and a horizontal coordinate represents spherical aberration values in a unit of millimeter. It can be learned from FIG. 11 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 12 is a diagram of astigmatism and field curvature that are obtained after the light with the wavelength of 555 nm passes through the optical lens 10 according to the second implementation. In FIG. 12, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 13 is a diagram of a distortion obtained after the light with the wavelength of 555 nm passes through the optical lens 10 according to the second implementation. In FIG. 13, a vertical coordinate represents a field of view in a unit of degree (°), and a horizontal coordinate represents a distortion value, in a unit of %, obtained after the light with the wavelength of 555 nm passes through the optical lens 10 in the second implementation. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

Figure 14:
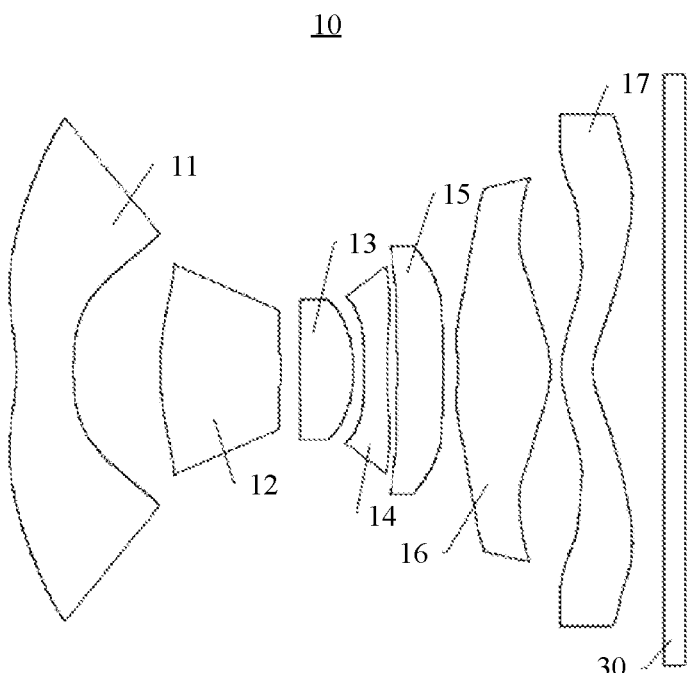
FIG. 14 is a schematic cross-sectional diagram of a plurality of lenses of an optical lens according to a third implementation of this application.

FIG. 14 is a schematic cross-sectional diagram of a plurality of lenses of the optical lens 10 according to a third implementation of this application. In this implementation, the optical lens 10 includes seven lenses: a first lens 11, a second lens 12, a third lens 13, a fourth lens 14, a fifth lens 15, a sixth lens 16, and a seventh lens 17. The first lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a negative focal power, the fifth lens 15 has a positive focal power, the sixth lens 16 has a positive focal power, and the seventh lens 17 has a negative focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the third implementation of this application are shown in Table 7.

as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In this implementation, there is at least one inflection point on each of object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of object-side surfaces and image-side surfaces of the lenses of the optical lens 10

TABLE 7

| Design parameters of the optical lens 10 in the third implementation | | | | | | | |
|---|---|---|---|---|---|---|---|
| Surface number | Surface type | Curvature radius | Thickness | Refractive index | Abbe number | Focal length | Conic coefficient |
| S1 | Aspheric surface | −1.80656 | 0.58079 | 1.54587 | 56.13540 | −2.138 | −1.00000 |
| S2 | Aspheric surface | 3.67000 | 0.87764 | | | | |
| S3 | Aspheric surface | 2.70073 | 1.21423 | 1.64458 | 23.54117 | 4.090 | |
| S4 | Aspheric surface | −91.55744 | 0.10000 | | | | |
| S5 | Aspheric surface | 12.78957 | 0.54150 | 1.54587 | 56.13540 | 2.664 | |
| S6 | Aspheric surface | −1.61595 | 0.10930 | | | | |
| S7 | Aspheric surface | −38.62257 | 0.23135 | 1.67757 | 19.24591 | −4.802 | |
| S8 | Aspheric surface | 3.56158 | 0.10110 | | | | |
| S9 | Aspheric surface | −15.77142 | 0.47485 | 1.57039 | 37.31646 | 4.798 | |
| S10 | Aspheric surface | −2.35748 | 0.14149 | | | | |
| S11 | Aspheric surface | −2.12659 | 0.93958 | 1.54587 | 56.13540 | 2.577 | |
| S12 | Aspheric surface | −0.97867 | 0.11132 | | | | −1.00000 |
| S13 | Aspheric surface | 0.75857 | 0.32010 | 1.66692 | 20.35321 | −25.947 | −27.30447 |
| S14 | Aspheric surface | 0.60403 | 0.72431 | | | | −5.93048 |
| S15 | Spheric surface | Infinity | 0.21000 | 1.51827 | 64.16641 | | |
| S16 | Spheric surface | Infinity | 0.29603 | | | | |

In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 8 shows aspheric coefficients of the optical lens 100 in the third implementation of this application.

TABLE 8

| | Aspheric coefficients of the lenses of the optical lens 10 in the third implementation | | | | | | |
|---|---|---|---|---|---|---|---|
| Surface number | A4 | A6 | A8 | A10 | A12 | A14 | A16 |
| S1 | 4.813E−01 | −5.548E−01 | 5.259E−01 | −3.779E−01 | 2.019E−01 | −8.031E−02 | 2.389E−02 |
| S2 | 1.237E−01 | 4.142E+00 | −2.768E+01 | 1.073E+02 | −2.785E+02 | 5.088E+02 | −6.718E+02 |
| S3 | −3.907E−02 | 9.575E−02 | −5.148E−01 | 1.224E+00 | −1.899E+00 | 1.891E+00 | −1.150E+00 |
| S4 | 4.601E−02 | −1.145E+00 | 1.181E+01 | −5.608E+01 | 3.537E+01 | 8.639E+02 | −3.970E+03 |
| S5 | −3.621E−02 | 3.816E−01 | −7.614E+00 | 6.701E+01 | −3.263E+02 | 7.902E+02 | −6.128E+02 |
| S6 | −2.757E−01 | −9.199E−01 | 7.202E+00 | 5.767E+00 | −2.386E+02 | 1.069E+03 | −2.268E+03 |
| S7 | −9.788E−01 | 5.293E+00 | −4.226E+01 | 2.249E+02 | −7.471E+02 | 1.538E+03 | −1.918E+03 |
| S8 | −3.857E−01 | 1.278E+00 | −4.104E+00 | 8.237E+00 | −9.706E+00 | 5.983E+00 | −9.739E−01 |
| S9 | −5.358E−02 | 1.281E+00 | −5.791E+00 | 1.320E+01 | −1.820E+01 | 1.576E+01 | −8.365E+00 |
| S10 | 1.161E+00 | −3.305E+00 | 5.185E+00 | −5.514E+00 | 4.012E+00 | −1.813E+00 | 3.646E−01 |
| S11 | 1.707E+00 | −3.979E+00 | 5.942E+00 | −6.320E+00 | 4.762E+00 | −2.309E+00 | 4.982E−01 |
| S12 | 2.732E−01 | 1.162E+00 | −3.319E+00 | 3.916E+00 | −2.597E+00 | 1.058E+00 | −2.711E−01 |
| S13 | 8.006E−01 | −3.448E+00 | 8.531E+00 | −1.355E+01 | 1.417E+01 | −1.008E+01 | 5.018E+00 |
| S14 | −1.094E−01 | −1.735E−01 | 7.641E−01 | −1.180E+00 | 1.064E+00 | −6.332E−01 | 2.619E−01 |

| Surface number | A18 | A20 | A22 | A24 | A26 | A28 | A30 |
|---|---|---|---|---|---|---|---|
| S1 | −5.313E−03 | 8.780E−04 | −1.061E−04 | 9.105E−06 | −5.247E−07 | 1.820E−08 | −2.870E−10 |
| S2 | 6.486E+02 | −4.582E+02 | 2.342E+02 | −8.427E+01 | 2.025E+01 | −2.916E+00 | 1.903E−01 |

| Surface number | A4 | A6 | A8 | A10 | A12 | A14 | A16 |
|---|---|---|---|---|---|---|---|
| S3 | 3.894E−01 | −5.629E−02 | 0.000E+00 | 0.000E+00 | 0.000E+00 | 0.000E+00 | 0.000E+00 |
| S4 | 7.260E+03 | −4.974E+03 | 0.000E+00 | 0.000E+00 | 0.000E+00 | 0.000E+00 | 0.000E+00 |
| S5 | −9.010E+02 | 1.402E+03 | 0.000E+00 | 0.000E+00 | 0.000E+00 | 0.000E+00 | 0.000E+00 |
| S6 | 2.425E+03 | −1.056E+03 | 0.000E+00 | 0.000E+00 | 0.000E+00 | 0.000E+00 | 0.000E+00 |
| S7 | 1.326E+03 | −3.880E+02 | 0.000E+00 | 0.000E+00 | 0.000E+00 | 0.000E+00 | 0.000E+00 |
| S8 | −7.876E−01 | 3.185E−01 | 0.000E+00 | 0.000E+00 | 0.000E+00 | 0.000E+00 | 0.000E+00 |
| S9 | 2.490E+00 | −3.187E−01 | 0.000E+00 | 0.000E+00 | 0.000E+00 | 0.000E+00 | 0.000E+00 |
| S10 | 3.507E−02 | −2.012E−02 | 0.000E+00 | 0.000E+00 | 0.000E+00 | 0.000E+00 | 0.000E+00 |
| S11 | 1.619E−01 | −1.729E−01 | 6.755E−02 | −1.530E−02 | 2.098E−03 | −1.619E−04 | 5.403E−06 |
| S12 | 4.268E−02 | −3.778E−03 | 1.440E−04 | 0.000E+00 | 0.000E+00 | 0.000E+00 | 0.000E+00 |
| S13 | −1.773E+00 | 4.461E−01 | −7.895E−02 | 9.539E−03 | −7.416E−04 | 3.288E−05 | −6.134E−07 |
| S14 | −7.724E−02 | 1.639E−02 | −2.487E−03 | 2.635E−04 | −1.853E−05 | 7.780E−07 | −1.476E−08 |

In this embodiment, all lenses with the aspheric surfaces satisfy the following formula:

$$z = \frac{cr^2}{1 + \sqrt{1 - Kc^2 r^2}} + A_2 r^2 + A_4 r^4 + \dots + A_{26} r^{26} + A_{28} r^{28} + A_{30} r^{30}$$

z is a vector height of an aspheric surface, r is a radial coordinate of the aspheric surface, c is a spherical curvature of a vertex on the aspheric surface, K is a conic constant, and $A_2$, $A_4$, $A_6$, $A_8$, $A_{10}$, . . . , $A_{26}$, $A_{28}$, and $A_{30}$ are aspheric coefficients.

The parameters in Table 8 are substituted into the foregoing formula, so that the lenses of the optical lens 10 in this implementation can be designed. The lenses of the optical lens 10 in this implementation are designed based on the parameters in Table 7 and Table 8, so that the optical lens 10 in this implementation can have basic parameters shown in Table 9.

TABLE 9

| Basic parameters of the optical lens 10 in the third implementation | | | |
|---|---|---|---|
| |f1/f | | 2.138 | f(mm) | 1.000 |
| |f2/f| | 4.090 | TTL(mm) | 7.074 |
| |f3/f| | 2.664 | IMH(mm) | 6.559 |
| |f4/f| | 4.802 | FOV(°) | 128° |
| |f5/f| | 4.798 | F# | 2.193 |

TABLE 9-continued

| Basic parameters of the optical lens 10 in the third implementation | | | |
|---|---|---|---|
| |f6/f| | 2.577 | |DIST| | 38% |
| |f7/f| | 25.947 | D1 | 5.182 |

It can be learned from the basic parameters of the optical lens 10 that, in this implementation, |f1/f|=2.138; |f2/f|=4.090; |f3/f|=2.664; |f4/f|=4.802; |f5/f|=4.798; |f6/f|=2.577; and |f7/f|=25.947. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, a total track length of the optical lens 10 can be reduced as much as possible, to miniaturize the optical lens 10.

In this embodiment, a maximum field of view of the optical lens 10 is 128°, and the maximum optical distortion |DIST| (unit: %)=38% is ensured within a full field of view range. Compared with a common optical lens 10, the optical lens 10 in this implementation can have a large field of view and a small optical distortion, to achieve good imaging effect.

An aperture value F # of the optical lens 10 in this implementation is 2.193, that is, the aperture value F # of the optical lens 10 in this implementation is small, so that the optical lens 10 can be used better under low illumination.

In this implementation, a ratio of a diameter D1 of the first lens 11 to a diagonal length of an effective pixel region on an imaging plane of the optical lens 10 is |D1/IMH|=0.790. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is |TTL/IMH|=1.078. In this implementation, the total track length TTL of the optical lens 10 is basically the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of a focal length f of the optical lens 10 to the total track length TTL of the optical lens 10 is |f/TTL|=0.141. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 15:
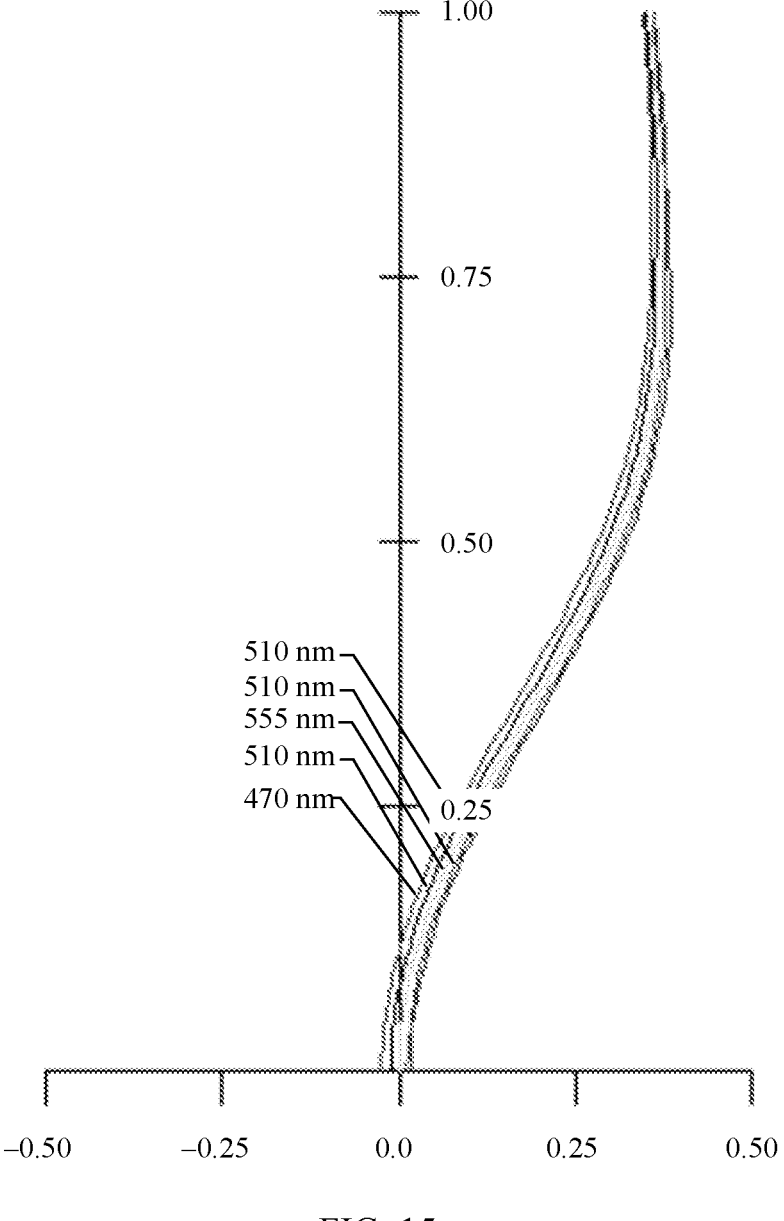
FIG. 15 is a diagram of spherical aberrations obtained after light with wavelengths of 650 nm, 610 nm, 555 nm, 510 nm, and 470 nm passes through an optical lens according to Embodiment 3.
Figure 16:
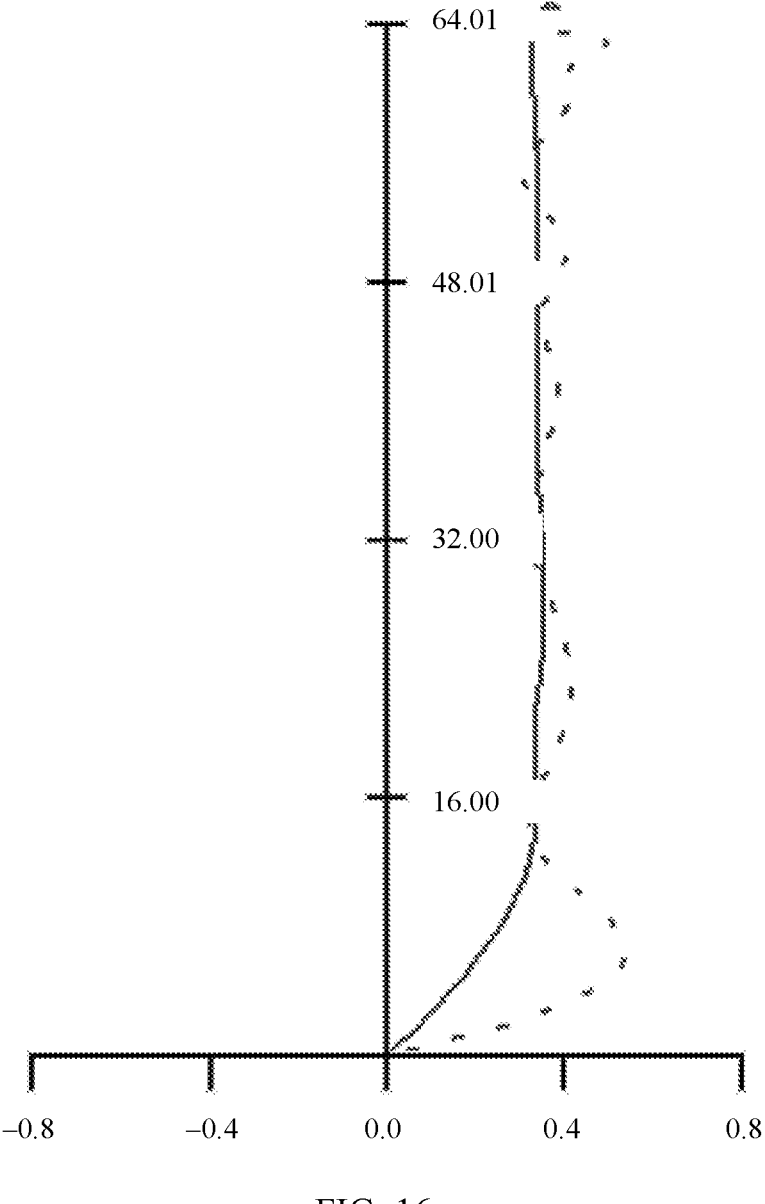
FIG. 16 is a diagram of astigmatism and field curvature that are obtained after light with a wavelength of 555 nm passes through an optical lens according to Embodiment 3.
Figure 17:
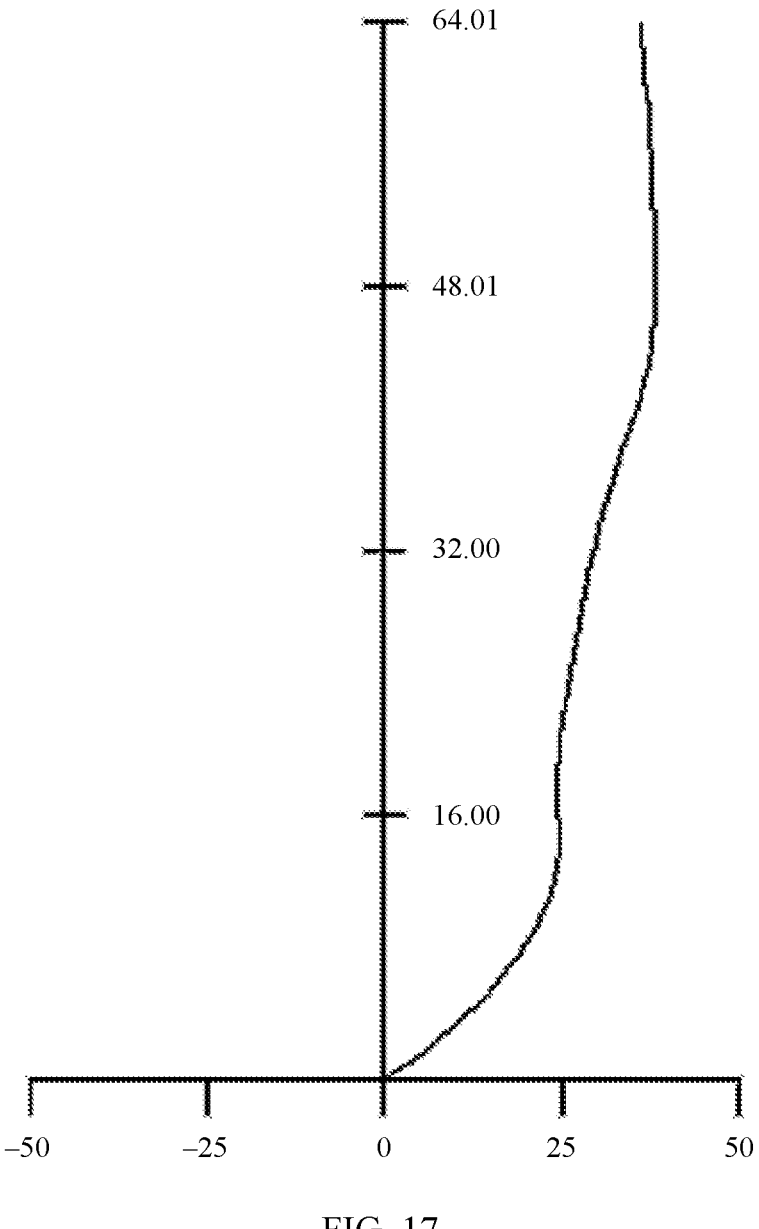
FIG. 17 is a diagram of a distortion obtained after light with a wavelength of 555 nm passes through an optical lens according to Embodiment 3.

FIG. 15 to FIG. 17 are diagrams representing optical performance of the optical lens 10 according to the third implementation.

Specifically, FIG. 15 is a diagram of spherical aberrations obtained after light with wavelengths of 650 nm, 610 nm, 555 nm, 510 nm, and 470 nm passes through the optical lens 10 according to the third implementation. In FIG. 15, a vertical coordinate represents normalized pupil coordinates, and a horizontal coordinate represents spherical aberration values in a unit of millimeter. It can be learned from FIG. 15 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 16 is a diagram of astigmatism and field curvature that are obtained after the light with the wavelength of 555 nm passes through the optical lens 10 according to the third implementation. In FIG. 16, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 17 is a diagram of a distortion obtained after the light with the wavelength of 555 nm passes through the optical lens 10 according to the third implementation. In FIG. 17, a vertical coordinate represents a field of view in a unit of degree (°), and a horizontal coordinate represents a distortion value, in a unit of %, obtained after the light with the wavelength of 555 nm passes through the optical lens 10 in the third implementation. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

Figure 18:
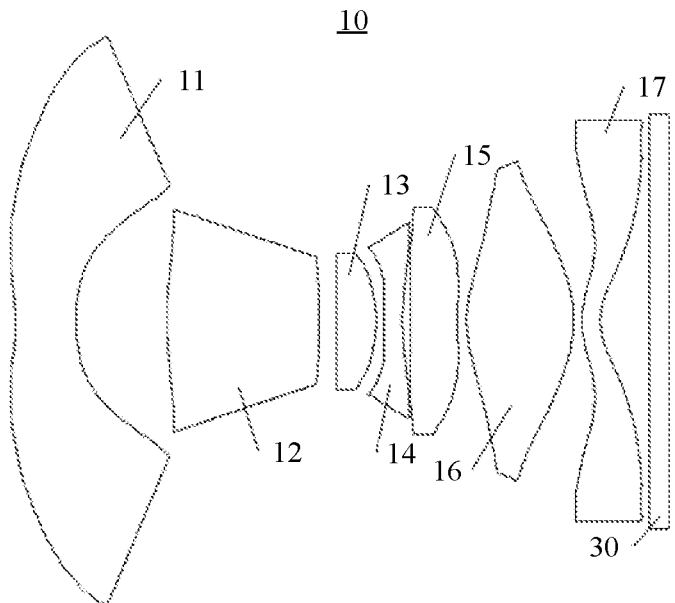
FIG. 18 is a schematic cross-sectional diagram of a plurality of lenses of an optical lens according to a fourth implementation of this application.

FIG. 18 is a schematic cross-sectional diagram of a plurality of lenses of the optical lens 10 according to a fourth implementation of this application. In this implementation, the optical lens 10 includes seven lenses: a first lens 11, a second lens 12, a third lens 13, a fourth lens 14, a fifth lens 15, a sixth lens 16, and a seventh lens 17. The first lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a negative focal power, the fifth lens 15 has a negative focal power, the sixth lens 16 has a positive focal power, and the seventh lens 17 has a negative focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the fourth implementation of this application are shown in Table 10.

TABLE 10

| | Design parameters of the optical lens 10 in the fourth implementation | | | | | | |
|---|---|---|---|---|---|---|---|
| Surface number | Surface type | Curvature radius | Thickness | Refractive index | Abbe number | Focal length | Conic coefficient |
| S1 | Aspheric surface | −2.89602 | 0.73863 | 1.54587 | 56.13540 | −2.302 | −1.00000 |
| S2 | Aspheric surface | 2.42016 | 1.09262 | | | | |
| S3 | Aspheric surface | 4.41499 | 1.83715 | 1.64458 | 23.54117 | 4.844 | |

TABLE 10-continued

| | | | | | | | |
|---|---|---|---|---|---|---|---|
| | Design parameters of the optical lens 10 in the fourth implementation | | | | | | |
| Surface number | Surface type | Curvature radius | Thickness | Refractive index | Abbe number | Focal length | Conic coefficient |
| S4 | Aspheric surface | −8.92539 | 0.10210 | | | | |
| S5 | Aspheric surface | 14.03408 | 0.48126 | 1.54587 | 56.13540 | 3.089 | |
| S6 | Aspheric surface | −1.89322 | 0.10000 | | | | |
| S7 | Aspheric surface | 8.32643 | 0.22000 | 1.67757 | 19.24591 | −4.190 | |
| S8 | Aspheric surface | 2.09466 | 0.10000 | | | | |
| S9 | Aspheric surface | −16.59189 | 0.56876 | 1.57039 | 37.31646 | −4.059 | |
| S10 | Aspheric surface | 2.72396 | 0.10000 | | | | |
| S11 | Aspheric surface | 1.13294 | 1.29908 | 1.54587 | 56.13540 | 1.359 | −1.00000 |
| S12 | Aspheric surface | −1.27996 | 0.10000 | | | | −1.00000 |
| S13 | Aspheric surface | 0.98228 | 0.22000 | 1.66692 | 20.35321 | −4.059 | −13.96630 |
| S14 | Aspheric surface | 0.65618 | 0.50358 | | | | −4.19519 |
| S15 | Spheric surface | Infinity | 0.23100 | 1.51827 | 64.16641 | | |
| S16 | Spheric surface | Infinity | 0.33232 | | | | |

In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In this implementation, there is at least one inflection point on each of object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of object-side surfaces and image-side surfaces of the lenses of the optical lens 10 are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 11 shows aspheric coefficients of the optical lens 100 in the fourth implementation of this application.

TABLE 11

| | | | | | | | |
|---|---|---|---|---|---|---|---|
| | Aspheric coefficients of the lenses of the optical lens 10 in the fourth implementation | | | | | | |
| Surface number | A4 | A6 | A8 | A10 | A12 | A14 | A16 |
| S1 | 2.216E−01 | −1.687E−01 | 1.099E−01 | −5.659E−02 | 2.210E−02 | −6.441E−03 | 1.394E−03 |
| S2 | 9.607E−03 | 1.754E+00 | −7.799E+00 | 2.037E+01 | −3.421E+01 | 3.725E+01 | −2.485E+01 |
| S3 | 1.546E−03 | −1.218E−01 | 3.456E−01 | −6.649E−01 | 7.997E−01 | −6.070E−01 | 2.818E−01 |
| S4 | −6.676E−03 | −4.435E−01 | 4.025E+00 | −1.879E+01 | 4.787E+01 | −5.399E+01 | −9.951E+00 |
| S5 | −3.638E−02 | 1.273E−01 | −2.572E+00 | 1.752E+01 | −6.784E+01 | 1.540E+02 | −2.003E+02 |
| S6 | −9.275E−02 | −5.846E−01 | 1.899E+00 | −5.783E−01 | −1.818E+01 | 6.516E+01 | −1.004E+02 |
| S7 | −3.076E−01 | −1.234E+00 | 4.552E+00 | −1.115E+01 | 1.962E+01 | −2.074E+01 | 9.858E+00 |
| S8 | −1.826E−01 | −4.732E−01 | 1.710E+00 | −3.142E+00 | 3.988E+00 | −3.488E+00 | 1.947E+00 |
| S9 | −7.133E−02 | 5.293E−01 | −1.155E+00 | 1.437E+00 | −1.105E+00 | 5.162E−01 | −1.303E−01 |
| S10 | −8.298E−01 | 1.497E+00 | −2.293E+00 | 2.477E+00 | −1.708E+00 | 6.786E−01 | −1.242E−01 |
| S11 | −6.338E−01 | 1.179E+00 | −1.933E+00 | 2.473E+00 | −2.403E+00 | 1.762E+00 | −9.689E−01 |

TABLE 11-continued

| | | | Aspheric coefficients of the lenses of the optical lens 10 in the fourth implementation | | | | |
|---|---|---|---|---|---|---|---|
| S12 | 2.563E-01 | -3.719E-01 | 4.281E-01 | -3.334E-01 | 1.689E-01 | -5.473E-02 | 1.129E-02 |
| S13 | 6.016E-01 | -2.579E+00 | 4.925E+00 | -6.327E+00 | 6.017E+00 | -4.333E+00 | 2.354E+00 |
| S14 | 3.848E-01 | -1.682E+00 | 3.121E+00 | -3.642E+00 | 2.939E+00 | -1.701E+00 | 7.155E-01 |

| Surface number | A18 | A20 | A22 | A24 | A26 | A28 | A30 |
|---|---|---|---|---|---|---|---|
| S1 | -2.232E-04 | 2.623E-05 | -2.226E-06 | 1.323E-07 | -5.208E-09 | 1.214E-10 | -1.264E-12 |
| S2 | 7.450E+00 | 2.593E+00 | -3.853E+00 | 1.904E+00 | -5.151E-01 | 7.595E-02 | -4.798E-03 |
| S3 | -7.286E-02 | 8.033E-03 | 0.000E+00 | 0.000E+00 | 0.000E+00 | 0.000E+00 | 0.000E+00 |
| S4 | 7.796E+01 | -4.937E+01 | 0.000E+00 | 0.000E+00 | 0.000E+00 | 0.000E+00 | 0.000E+00 |
| S5 | 1.351E+02 | -3.640E+01 | 0.000E+00 | 0.000E+00 | 0.000E+00 | 0.000E+00 | 0.000E+00 |

| Surface number | A4 | A6 | A8 | A10 | A12 | A14 | A16 |
|---|---|---|---|---|---|---|---|
| S6 | 6.210E+01 | 6.543E+00 | -1.751E+01 | 0.000E+00 | 0.000E+00 | 0.000E+00 | 0.000E+00 |
| S7 | 2.644E-02 | -1.235E+00 | 2.498E-01 | 0.000E+00 | 0.000E+00 | 0.000E+00 | 0.000E+00 |
| S8 | -6.151E-01 | 8.332E-02 | 0.000E+00 | 0.000E+00 | 0.000E+00 | 0.000E+00 | 0.000E+00 |
| S9 | 1.149E-02 | 8.812E-04 | -3.797E-05 | 0.000E+00 | 0.000E+00 | 0.000E+00 | 0.000E+00 |
| S10 | 7.139E-05 | 2.337E-03 | -1.189E-04 | 1.999E-05 | 0.000E+00 | 0.000E+00 | 0.000E+00 |
| S11 | 3.966E-01 | -1.194E-01 | 2.588E-02 | -3.914E-03 | 3.902E-04 | -2.298E-05 | 6.034E-07 |
| S12 | -1.490E-03 | 1.331E-04 | -9.830E-06 | 6.596E-07 | -2.464E-08 | 0.000E+00 | 0.000E+00 |
| S13 | -9.532E-02 | 2.837E-01 | -6.084E-02 | 9.116E-03 | -9.032E-04 | 5.309E-05 | -1.400E-06 |
| S14 | -2.195E-01 | 4.886E-02 | -7.777E-03 | 8.603E-04 | -6.271E-05 | 2.705E-06 | -5.225E-08 |

In this embodiment, all lenses with the aspheric surfaces satisfy the following formula:

$$z = \frac{cr^2}{1 + \sqrt{1 - Kc^2 r^2}} + A_2 r^2 + A_4 r^4 + \ldots + A_{26} r^{26} + A_{28} r^{28} + A_{30} r^{30}$$

z is a vector height of an aspheric surface, r is a radial coordinate of the aspheric surface, c is a spherical curvature of a vertex on the aspheric surface, K is a conic constant, and $A_2$, $A_4$, $A_6$, $A_8$, $A_{10}$, . . . , $A_{26}$, $A_{28}$, and $A_{30}$ are aspheric coefficients.

The parameters in Table 11 are substituted into the foregoing formula, so that the lenses of the optical lens 10 in this implementation can be designed. The lenses of the optical lens 10 in this implementation are designed based on the parameters in Table 10 and Table 11, so that the optical lens 10 in this implementation can have basic parameters shown in Table 12.

TABLE 12

| | | Basic parameters of the optical lens 10 in the fourth implementation | | |
|---|---|---|---|---|
| \|f1/f\| | 2.093 | f(mm) | 1.100 |
| \|f2/f\| | 4.404 | TTL(mm) | 8.126 |
| \|f3/f\| | 2.808 | IMH(mm) | 4.977 |
| \|f4/f\| | 3.809 | FOV(°) | 131° |
| \|f5/f\| | 3.690 | F# | 1.510 |
| \|f6/f\| | 1.236 | \|DIST\| | 17.6% |
| \|f7/f\| | 3.69 | D1 | 6.420 |

It can be learned from the basic parameters of the optical lens 10 that, in this implementation, |f1/f|=2.093; |f2/f|=4.404; |f3/f|=2.808; |f4/f|=3.809; |f5/f|=3.690; |f6/f|=1.236; and I|f7/f|=3.69. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, the total track length of the optical lens 10 can be reduced as much as possible, to miniaturize the optical lens 10.

In this embodiment, a maximum field of view of the optical lens 10 is 131°, and the maximum optical distortion |DIST| (unit: %)=17.6% is ensured within a full field of view range. Compared with a common optical lens 10, the optical lens 10 in this implementation can have a large field of view and a small optical distortion, to achieve good imaging effect.

An aperture value F # of the optical lens 10 in this implementation is 1.510, that is, the aperture value F # of the optical lens 10 in this implementation is small, so that the optical lens 10 can be used better under low illumination.

In this implementation, a ratio of a diameter D1 of the first lens 11 to a diagonal length of an effective pixel region on an imaging plane of the optical lens 10 is |D1/IMH|=1.290. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is |TTL/IMH|=1.633. In this implementation, the total track length TTL of the optical lens 10 is almost the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of a focal length f of the optical lens 10 to the total track length TTL of the optical lens 10 is |f/TTL|=0.135. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 19:
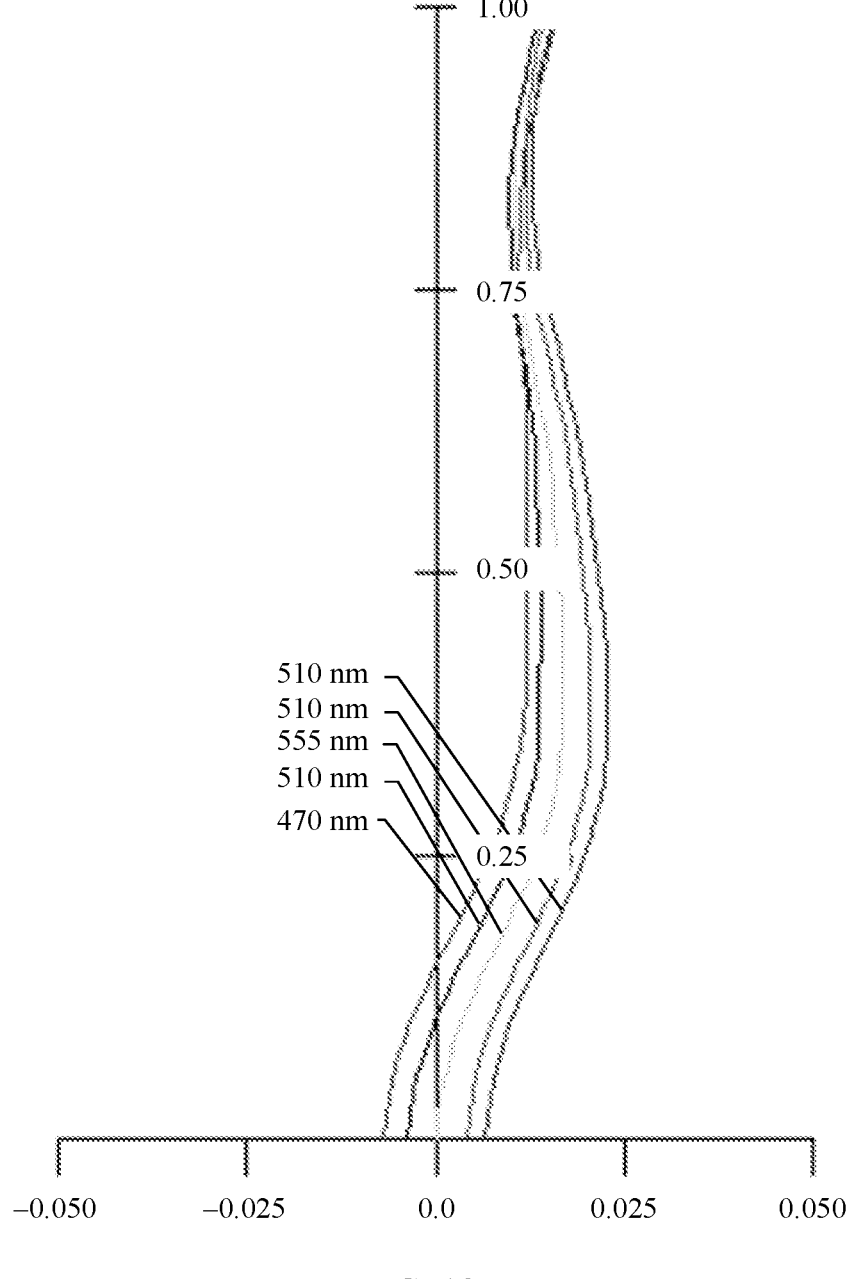
FIG. 19 is a diagram of spherical aberrations obtained after light with wavelengths of 650 nm, 610 nm, 555 nm, 510 nm, and 470 nm passes through an optical lens according to Embodiment 4.
Figure 20:
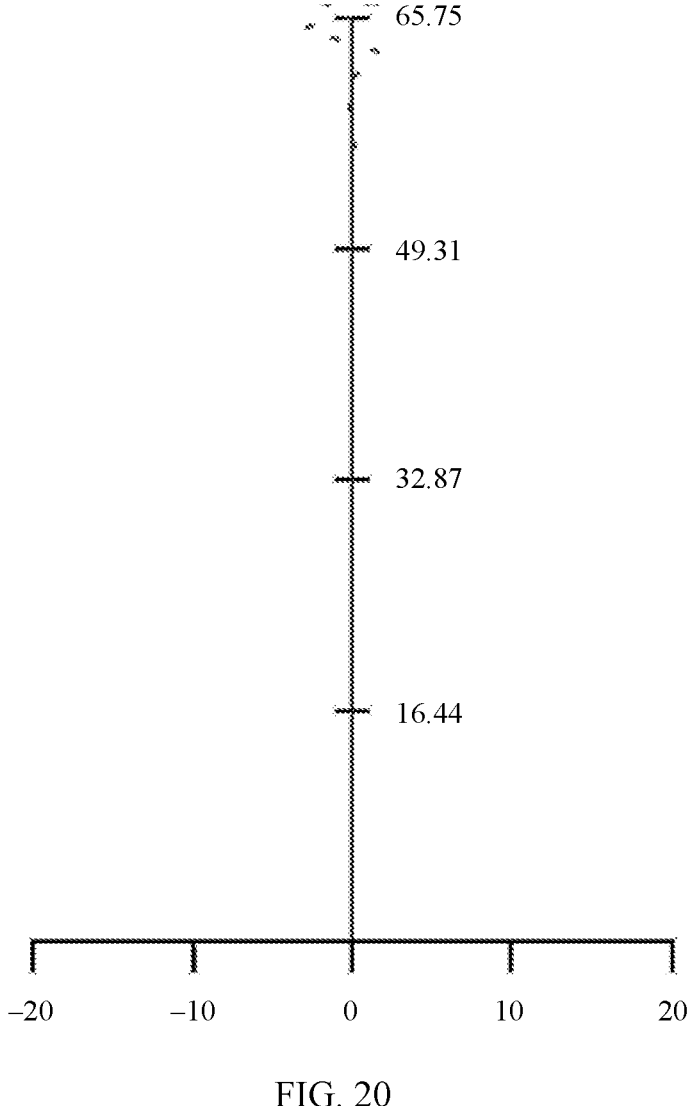
FIG. 20 is a diagram of astigmatism and field curvature that are obtained after light with a wavelength of 555 nm passes through an optical lens according to Embodiment 4.
Figure 21:
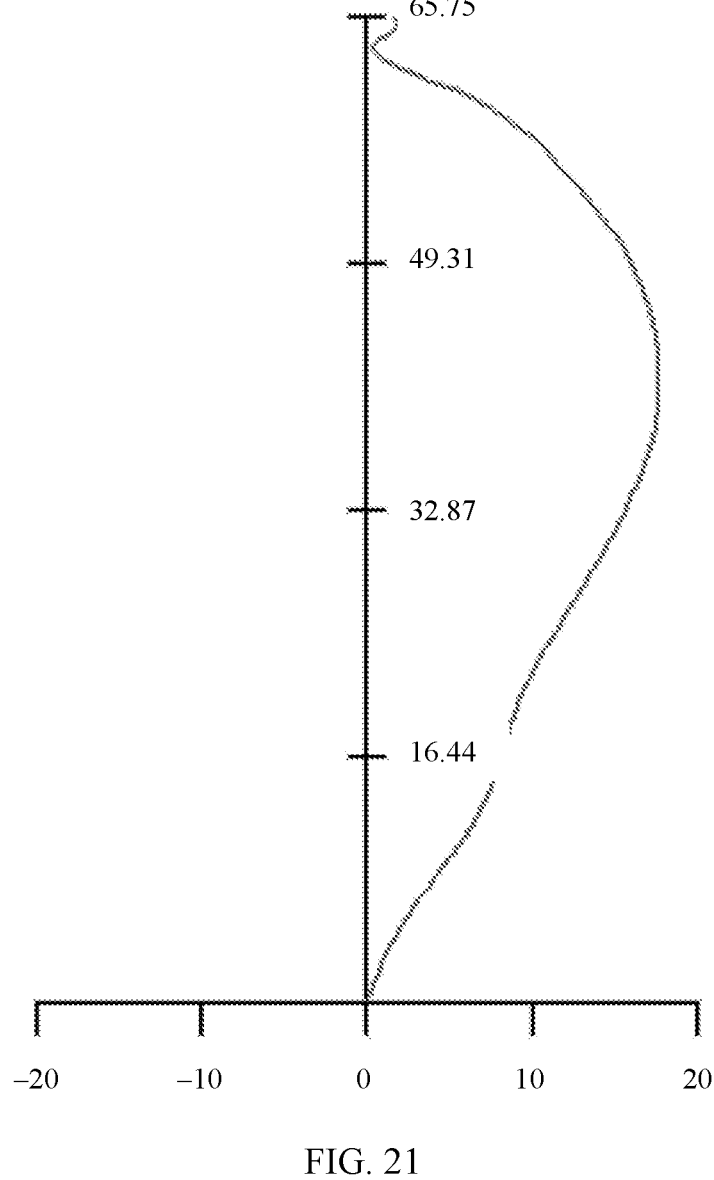
FIG. 21 is a diagram of a distortion obtained after light with a wavelength of 555 nm passes through an optical lens according to Embodiment 4.

FIG. 19 to FIG. 21 are diagrams representing optical performance of the optical lens 10 according to the fourth implementation.

Specifically, FIG. 19 is a diagram of spherical aberrations obtained after light with wavelengths of 650 nm, 610 nm, 555 nm, 510 nm, and 470 nm passes through the optical lens 10 according to the fourth implementation. In FIG. 19, a vertical coordinate represents normalized pupil coordinates, and a horizontal coordinate represents spherical aberration values in a unit of millimeter. It can be learned from FIG. 19 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 20 is a diagram of astigmatism and field curvature that are obtained after the light with the wavelength of 555 nm passes through the optical lens 10 according to the fourth implementation. In FIG. 20, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 21 is a diagram of a distortion obtained after the light with the wavelength of 555 nm passes through the optical lens 10 according to the fourth implementation. In FIG. 21, a vertical coordinate represents a field of view in a unit of degree (°), and a horizontal coordinate represents a distortion value, in a unit of %, obtained after the light with the wavelength of 555 nm passes through the optical lens 10 in the fourth implementation. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

Figure 22:
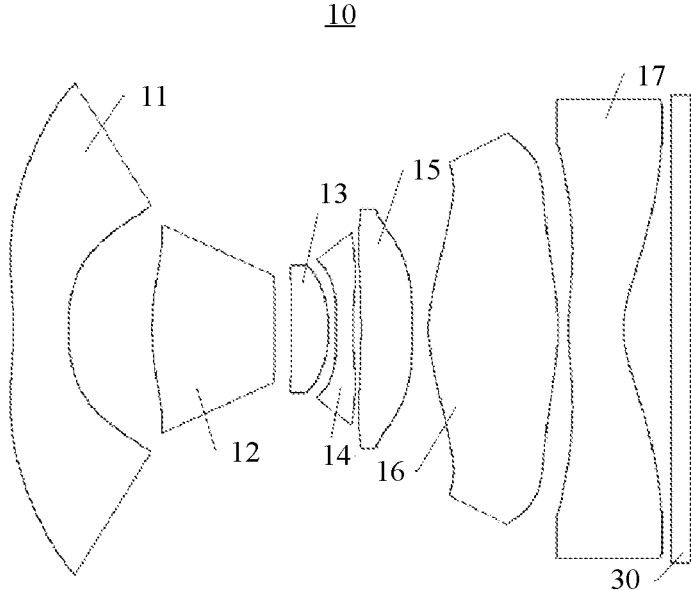
FIG. 22 is a schematic cross-sectional diagram of a plurality of lenses of an optical lens according to a fifth implementation of this application.

FIG. 22 is a schematic cross-sectional diagram of a plurality of lenses of the optical lens 10 according to a fifth implementation of this application. In this implementation, the optical lens 10 includes seven lenses: a first lens 11, a second lens 12, a third lens 13, a fourth lens 14, a fifth lens 15, a sixth lens 16, and a seventh lens 17. The first lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a positive focal power, the fifth lens 15 has a negative focal power, the sixth lens 16 has a positive focal power, and the seventh lens 17 has a negative focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the fifth implementation of this application are shown in Table 13.

TABLE 13

| Design parameters of the optical lens 10 in the fifth implementation | | | | | | | |
|---|---|---|---|---|---|---|---|
| Surface number | Surface type | Curvature radius | Thickness | Refractive index | Abbe number | Focal length | Conic coefficient |
| S1 | Aspheric surface | −3.51374 | 0.68598 | 1.54587 | 56.13540 | −2.952 | |
| S2 | Aspheric surface | 3.18183 | 1.04535 | | | | |
| S3 | Aspheric surface | 3.57211 | 1.52452 | 1.64458 | 23.54117 | 5.064 | |
| S4 | Aspheric surface | −31.51479 | 0.10000 | | | | |
| S5 | Aspheric surface | 38.87307 | 0.46029 | 1.54587 | 56.13540 | 3.133 | |
| S6 | Aspheric surface | −1.78167 | 0.10000 | | | | |
| S7 | Aspheric surface | −23.17261 | 0.20721 | 1.67757 | 19.24591 | −4.352 | |
| S8 | Aspheric surface | 3.39137 | 0.10000 | | | | |
| S9 | Aspheric surface | −10.26463 | 0.63239 | 1.57039 | 37.31646 | −13.635 | |
| S10 | Aspheric surface | 32.81986 | 0.20977 | | | | |
| S11 | Aspheric surface | 1.76800 | 1.61462 | 1.54587 | 56.13540 | 2.390 | −1.00000 |
| S12 | Aspheric surface | −3.37372 | 0.12689 | | | | |

TABLE 13-continued

| Surface number | Surface type | Curvature radius | Thickness | Refractive index | Abbe number | Focal length | Conic coefficient |
|---|---|---|---|---|---|---|---|
| S13 | Aspheric surface | 3.02950 | 0.69029 | 1.66692 | 20.35321 | −4.110 | −34.47560 |
| S14 | Aspheric surface | 1.30784 | 0.60259 | | | | −5.56959 |
| S15 | Spheric surface | Infinity | 0.23100 | 1.51827 | 64.16641 | | |
| S16 | Spheric surface | Infinity | 0.33232 | | | | |

*Design parameters of the optical lens 10 in the fifth implementation*

In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In this implementation, there is at least one inflection point on each of object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of object-side surfaces and image-side surfaces of the lenses of the optical lens 10 are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 14 shows aspheric coefficients of the optical lens 100 in the fifth implementation of this application.

TABLE 14

*Aspheric coefficients of the lenses of the optical lens 10 in the fifth implementation*

| Surface number | A4 | A6 | A8 | A10 | A12 | A14 | A16 |
|---|---|---|---|---|---|---|---|
| S1 | 1.761E−01 | −1.210E−01 | 7.504E−02 | −3.683E−02 | 1.361E−02 | −3.702E−03 | 7.280E−04 |
| S2 | 2.252E−01 | −1.540E−01 | 6.291E−01 | −2.813E+00 | 7.969E+00 | −1.479E+01 | 1.886E+01 |
| S3 | −8.075E−03 | −3.483E−02 | 4.948E−02 | −9.270E−02 | 1.086E−01 | −7.989E−02 | 3.378E−02 |
| S4 | −3.564E−02 | −2.539E−01 | 2.495E+00 | −1.418E+01 | 5.095E+01 | −1.137E+02 | 1.552E+02 |
| S5 | −2.623E−02 | −4.232E−01 | 4.282E+00 | −3.325E+01 | 1.682E+02 | −5.490E+02 | 1.104E+03 |
| S6 | −1.732E−01 | 1.582E−01 | −1.264E+00 | 5.484E+00 | −1.433E+01 | 1.998E+01 | −1.315E+01 |
| S7 | −4.393E−01 | −2.202E−02 | 2.647E−01 | −1.349E+00 | 8.489E+00 | −2.622E+01 | 3.756E+01 |
| S8 | −2.457E−01 | 8.279E−02 | 7.338E−02 | 2.462E−01 | −1.075E+00 | 1.575E+00 | −1.180E+00 |
| S9 | −4.616E−02 | 2.065E−01 | −3.004E−01 | 1.783E−01 | 6.229E−02 | −1.600E−01 | 9.826E−02 |
| S10 | −3.351E−01 | 3.378E−01 | −3.729E−01 | 3.997E−01 | −3.563E−01 | 2.212E−01 | −8.496E−02 |
| S11 | −2.021E−01 | 1.964E−01 | −2.119E−01 | 2.176E−01 | −1.829E−01 | 1.171E−01 | −5.632E−02 |
| S12 | 1.132E−02 | 1.365E−01 | −2.261E−01 | 1.968E−01 | −1.030E−01 | 3.380E−02 | −6.972E−03 |
| S13 | −7.410E−02 | 2.156E−02 | 6.255E−02 | −1.539E−01 | 1.778E−01 | −1.268E−01 | 6.126E−02 |
| S14 | −7.830E−02 | 6.320E−02 | −3.057E−02 | −8.306E−04 | 1.358E−02 | −1.102E−02 | 5.053E−03 |

| Surface number | A18 | A20 | A22 | A24 | A26 | A28 | A30 |
|---|---|---|---|---|---|---|---|
| S1 | −1.007E−04 | 9.237E−06 | −4.737E−07 | 2.097E−09 | 1.372E−09 | −8.039E−11 | 1.565E−12 |
| S2 | −1.697E+01 | 1.088E+01 | −4.948E+00 | 1.561E+00 | −3.249E−01 | 4.021E−02 | −2.242E−03 |
| S3 | −6.866E−03 | 4.350E−04 | 0.000E+00 | 0.000E+00 | 0.000E+00 | 0.000E+00 | 0.000E+00 |
| S4 | −1.191E+02 | 4.006E+01 | 0.000E+00 | 0.000E+00 | 0.000E+00 | 0.000E+00 | 0.000E+00 |
| S5 | −1.237E+03 | 5.877E+02 | 0.000E+00 | 0.000E+00 | 0.000E+00 | 0.000E+00 | 0.000E+00 |
| S6 | −1.541E+00 | 9.935E+00 | −7.030E+00 | 0.000E+00 | 0.000E+00 | 0.000E+00 | 0.000E+00 |
| S7 | −2.098E+01 | −3.411E+00 | 5.911E+00 | 0.000E+00 | 0.000E+00 | 0.000E+00 | 0.000E+00 |
| S8 | 4.545E−01 | −7.123E−02 | 0.000E+00 | 0.000E+00 | 0.000E+00 | 0.000E+00 | 0.000E+00 |

TABLE 14-continued

| Surface number | A4 | A6 | A8 | A10 | A12 | A14 | A16 |
|---|---|---|---|---|---|---|---|
| | | Aspheric coefficients of the lenses of the optical lens 10 in the fifth implementation | | | | | |
| S9 | −2.724E−02 | 3.020E−03 | −3.770E−05 | 0.000E+00 | 0.000E+00 | 0.000E+00 | 0.000E+00 |
| S10 | 1.830E−02 | −1.883E−03 | 1.446E−04 | −3.126E−05 | 0.000E+00 | 0.000E+00 | 0.000E+00 |
| S11 | 2.022E−02 | −5.353E−03 | 1.018E−03 | −1.334E−04 | 1.124E−05 | −5.355E−07 | 1.058E−08 |
| S12 | 8.729E−04 | −5.978E−05 | 1.670E−06 | −7.406E−09 | 1.380E−09 | 0.000E+00 | 0.000E+00 |
| S13 | −2.091E−02 | 5.134E−03 | −9.035E−04 | 1.113E−04 | −9.105E−06 | 4.437E−07 | −9.732E−09 |
| S14 | −1.538E−03 | 3.245E−04 | −4.779E−05 | 4.822E−06 | −3.177E−07 | 1.230E−08 | −2.123E−10 |

In this embodiment, all lenses with the aspheric surfaces satisfy the following formula:

$$z = \frac{cr^2}{1 + \sqrt{1 - Kc^2 r^2}} + A_2 r^2 + A_4 r^4 + \ldots + A_{26} r^{26} + A_{28} r^{28} + A_{30} r^{30}$$

z is a vector height of an aspheric surface, r is a radial coordinate of the aspheric surface, c is a spherical curvature of a vertex on the aspheric surface, K is a conic constant, and $A_2$, $A_4$, $A_6$, $A_8$, $A_{10}$, . . . , $A_{26}$, $A_{28}$, and $A_{30}$ are aspheric coefficients.

The parameters in Table 14 are substituted into the foregoing formula, so that the lenses of the optical lens 10 in this implementation can be designed. The lenses of the optical lens 10 in this implementation are designed based on the parameters in Table 13 and Table 14, so that the optical lens 10 in this implementation can have basic parameters shown in Table 15.

TABLE 15

| Basic parameters of the optical lens 10 in the fifth implementation | | | |
|---|---|---|---|
| |f1/f | | 1.485 | f(mm) | 1.990 |
| |f2/f| | 2.548 | TTL(mm) | 8.775 |
| |f3/f| | 1.577 | IMH(mm) | 5.969 |
| |f4/f| | 2.190 | FOV(°) | 131° |
| |f5/f| | 6.861 | F# | 2.727 |
| |f6/f| | 1.203 | |DIST| | 32.4% |
| |f7/f| | 2.068 | D1 | 6.14 | f1 represents a focal length of the first lens 11, f2 represents a focal length of the second lens 12, f3 represents a focal length of the third lens 13, f4 represents a focal length of the fourth lens 14, f5 represents a focal length of the fifth lens 15, f6 represents a focal length of the sixth lens 16, f7 represents a focal length of the seventh lens 17, f represents a focal length of the optical lens 10, TTL represents a total track length of the optical lens 10, IMH represents a diagonal length of an effective pixel region on the photosensitive element 20, FOV represents a field of view of the optical lens 10, F # represents an aperture F-number of the optical lens 10, DIST represents a maximum optical distortion of the optical lens 10 within a full field of view range, and D1 represents a diameter of the first lens 11. It should be noted that, in this application, symbols such as f1, f2, f3, f4, f5, f6, f7, f, TTL, FOV, IMH, DIST, and D1 represent same meanings, and details are not described again when the symbols appear below again.

It can be learned from the basic parameters of the optical lens 10 that, in this implementation, |f1/f|=1.485; |f2/f|=2.548; |f3/f|=1.577; |f4/f|=2.190; |f5/f|=6.861; |f6/f|=1.203; and |f7/f|=2.068. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, the total track length of the optical lens 10 can be reduced as much as possible, to miniaturize the optical lens 10.

In this embodiment, a maximum field of view of the optical lens 10 is 131°, and the maximum optical distortion |DIST| (unit: %)=32.4% is ensured within a full field of view range. Compared with a common optical lens 10, the optical lens 10 in this implementation can have a large field of view and a small optical distortion, to achieve good imaging effect.

An aperture value F # of the optical lens 10 in this implementation is 2.727, that is, the aperture value F # of the optical lens 10 in this implementation is small, so that the optical lens 10 can be used better under low illumination.

In this implementation, a ratio of the diameter D1 of the first lens 11 to the diagonal length of the effective pixel region on an imaging plane of the optical lens 10 is |D1/IMH|=1.029. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is |TTL/IMH|=1.470. In this implementation, the total track length TTL of the optical lens 10 is basically the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of a focal length f of the optical lens 10 to the total track length TTL of the optical lens 10 is |f/TTL|=0.227. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 23:
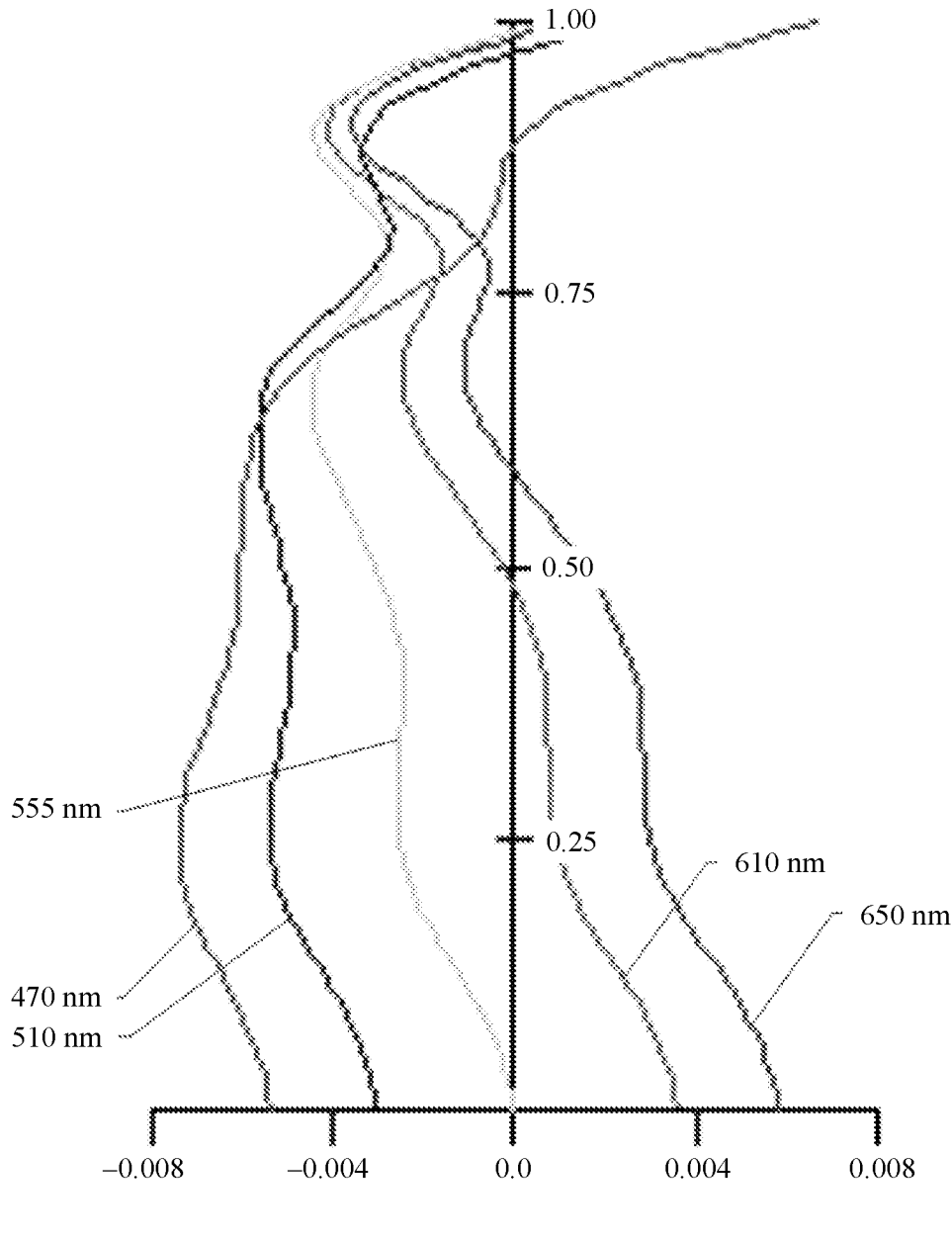
FIG. 23 is a diagram of spherical aberrations obtained after light with wavelengths of 650 nm, 610 nm, 555 nm, 510 nm, and 470 nm passes through an optical lens according to Embodiment 5.
Figure 24:
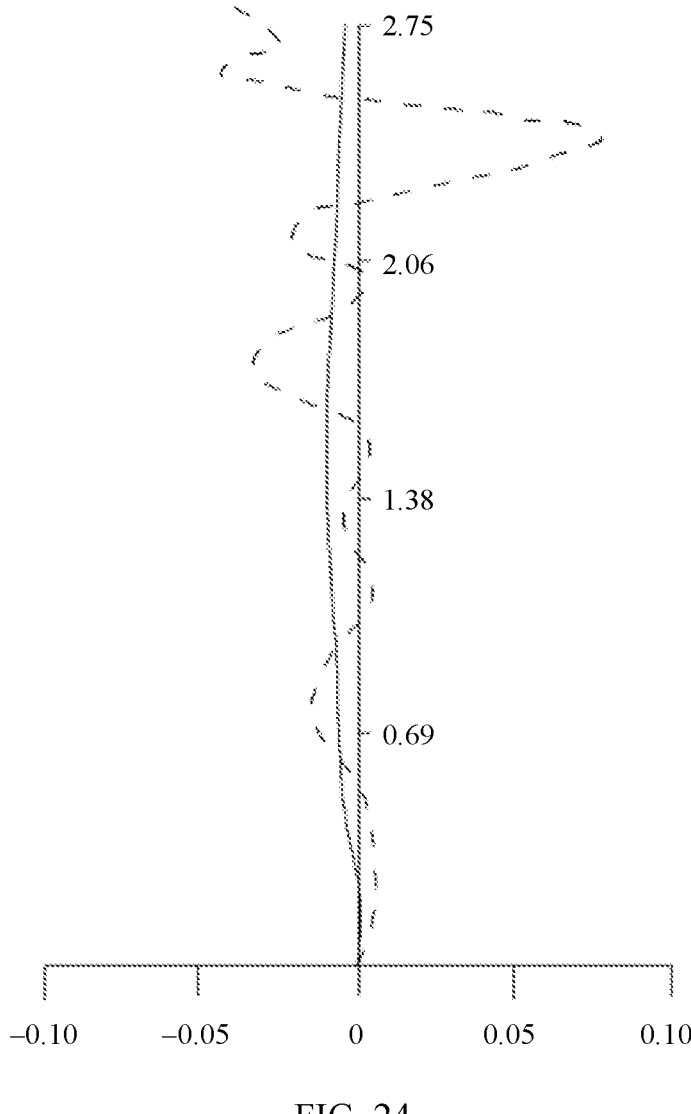
FIG. 24 is a diagram of astigmatism and field curvature that are obtained after light with a wavelength of 555 nm passes through an optical lens according to Embodiment 5.
Figure 25:
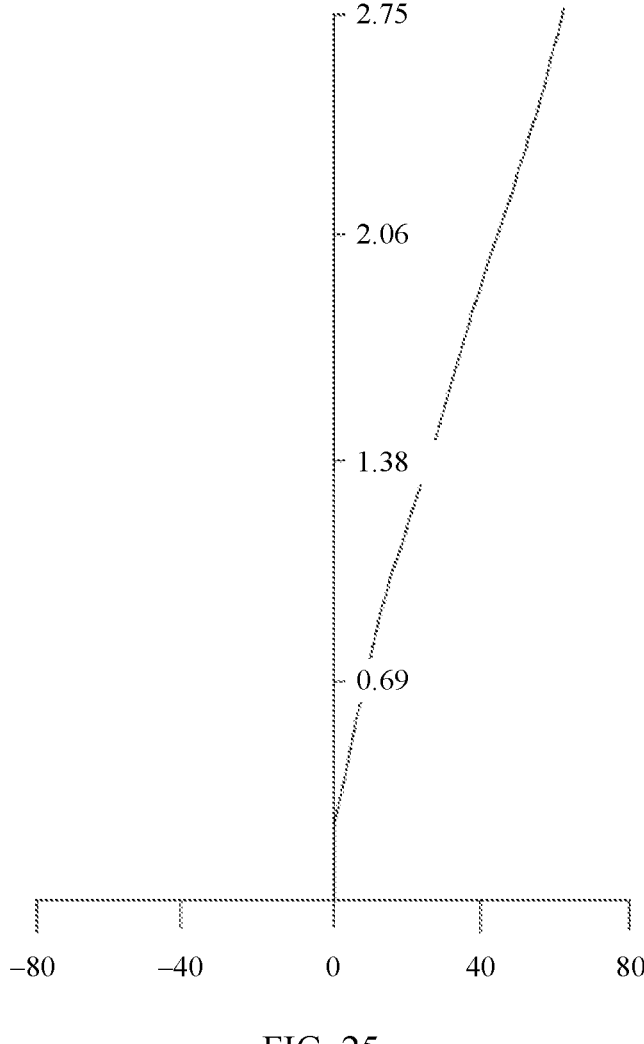
FIG. 25 is a diagram of a distortion obtained after light with a wavelength of 555 nm passes through an optical lens according to Embodiment 5.

FIG. 23 to FIG. 25 are diagrams representing optical performance of the optical lens 10 according to the fifth implementation.

Specifically, FIG. 23 is a diagram of spherical aberrations obtained after light with wavelengths of 650 nm, 610 nm, 555 nm, 510 nm, and 470 nm passes through the optical lens 10 according to the fifth implementation. In FIG. 23, a vertical coordinate represents normalized pupil coordinates, and a horizontal coordinate represents spherical aberration values in a unit of millimeter. It can be learned from FIG. 23 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 24 is a diagram of astigmatism and field curvature that are obtained after the light with the wavelength of 555 nm passes through the optical lens 10 according to the fifth implementation. In FIG. 24, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 25 is a diagram of a distortion obtained after the light with the wavelength of 555 nm passes through the optical lens 10 according to the fifth implementation. In FIG. 25, a vertical coordinate represents a field of view in a unit of degree (°), and a horizontal coordinate represents a distortion value, in a unit of %, obtained after the light with the wavelength of 555 nm passes through the optical lens 10 in the fifth implementation. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

Figure 26:
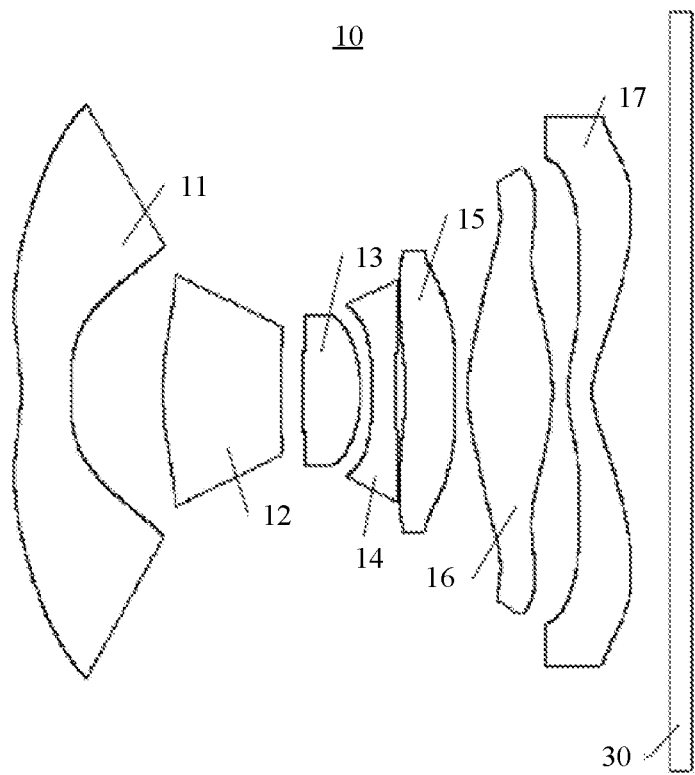
FIG. 26 is a schematic cross-sectional diagram of a plurality of lenses of an optical lens according to a sixth implementation of this application.

FIG. 26 is a schematic cross-sectional diagram of a plurality of lenses of the optical lens 10 according to a sixth implementation of this application. In this implementation, the optical lens 10 includes seven lenses: a first lens 11, a second lens 12, a third lens 13, a fourth lens 14, a fifth lens 15, a sixth lens 16, and a seventh lens 17. The first lens 11, the second lens 12, the third lens 13, the fourth lens 14, the fifth lens 15, the sixth lens 16, and the seventh lens 17 are sequentially disposed from an object side to an image side, and the lenses are coaxially disposed. The first lens 11 has a negative focal power, the second lens 12 has a positive focal power, the third lens 13 has a positive focal power, the fourth lens 14 has a positive focal power, the fifth lens 15 has a negative focal power, the sixth lens 16 has a positive focal power, and the seventh lens 17 has a negative focal power.

In this implementation, the first lens 11 to the seventh lens 17 are all made of optical plastic, so that each lens of the optical lens 10 is simply and conveniently manufactured, and manufacturing costs of the optical lens 10 can be reduced.

According to the foregoing relationship, design parameters of the optical lens 10 in the sixth implementation of this application are shown in Table 16.

TABLE 16

| Design parameters of the optical lens 10 in the sixth implementation | | | | | | | |
|---|---|---|---|---|---|---|---|
| Surface number | Surface type | Curvature radius | Thickness | Refractive index | Abbe number | Focal length | Conic coefficient |
| S1 | Aspheric surface | −1.71211 | 0.47669 | 1.54587 | 56.13540 | −1.585 | −1.00000 |
| S2 | Aspheric surface | 1.92088 | 0.88937 | | | | |
| S3 | Aspheric surface | 3.22331 | 1.14534 | 1.64458 | 23.54117 | 5.274 | |
| S4 | Aspheric surface | 21.94607 | 0.10605 | | | | |
| S5 | Aspheric surface | 5.96646 | 0.55641 | 1.54587 | 56.13540 | 2.781 | |
| S6 | Aspheric surface | −1.96902 | 0.09958 | | | | |
| S7 | Aspheric surface | 8.15948 | 0.23568 | 1.67757 | 19.24591 | −12.211 | |
| S8 | Aspheric surface | 4.06023 | 0.10004 | | | | |
| S9 | Aspheric surface | −2.30367 | 0.48375 | 1.57039 | 37.31646 | −3.684 | |
| S10 | Aspheric surface | 25.75454 | 0.11505 | | | | |
| S11 | Aspheric surface | 1.36534 | 0.81936 | 1.54587 | 56.13540 | 1.553 | −1.00000 |
| S12 | Aspheric surface | −1.76261 | 0.15016 | | | | −1.00000 |
| S13 | Aspheric surface | 1.12876 | 0.23679 | 1.66692 | 20.35321 | −3.481 | −21.94598 |
| S14 | Aspheric surface | 0.69577 | 0.75370 | | | | −5.80035 |

TABLE 16-continued

Design parameters of the optical lens 10 in the sixth implementation

| Surface number | Surface type | Curvature radius | Thickness | Refractive index | Abbe number | Focal length | Conic coefficient |
|---|---|---|---|---|---|---|---|
| S15 | Spheric surface | Infinity | 0.21000 | 1.51827 | 64.16641 | | |
| S16 | Spheric surface | Infinity | 0.33356 | | | | |

In this implementation, the first lens 11 is a lens bent towards the image side of the optical lens 10, and the first lens 11 has the negative focal power, so that a scene within a larger field of view range can enter the optical lens 10, and a field of view of the optical lens 10 is increased. A combined focal power of the second lens 12 and the third lens 13 is a positive focal power, and light that is incident from the first lens 11 can be converged, to reduce a light loss, so that the light is converged into the optical lens 10 as much as possible and transmitted to the photosensitive element 20. A combined focal power of the fourth lens 14 and the fifth lens 15 is a negative focal power, and can be used to expand a beam of light, to increase an image height of an image formed on the photosensitive element 20, so that the optical lens 10 can match a photosensitive element with a maximum chief ray angle, and a modulation transfer function of the optical lens 10 is improved. A combined focal power of the sixth lens 16 and the seventh lens 17 is a negative focal power, and can also be used to expand the beam of the light, to further increase the image height of the image formed on the photosensitive element 20, so that the optical lens 10 can match the photosensitive element with the maximum chief ray angle, and the modulation transfer function of the optical lens 10 is further improved.

In this implementation, there is at least one inflection point on each of object-side surfaces of the first lens 11, the sixth lens 16, and the seventh lens 17, so that the first lens 11, the sixth lens 16, and the seventh lens 17 each function well in adjusting an optical distortion and eliminating an aberration. This can reduce a distortion of the optical lens 10, and further ensure that the optical lens 10 can have a large field of view and a small distortion, to achieve good optical effect.

In this implementation, surfaces of object-side surfaces and image-side surfaces of the lenses of the optical lens 10 are all high-order aspheric surfaces, so that a high-order aspheric coefficient of each lens can be optimal through coordination between the lenses, to effectively correct a peripheral aberration such as astigmatism or a distortion, and especially well correct a peripheral aberration obtained when a large field of view is used.

Table 17 shows aspheric coefficients of the optical lens 100 in the sixth implementation of this application.

TABLE 17

Aspheric coefficients of the lenses of the optical lens 10 in the sixth implementation

| Surface number | A4 | A6 | A8 | A10 | A12 | A14 | A16 |
|---|---|---|---|---|---|---|---|
| S1 | 5.484E−01 | −6.867E−01 | 7.035E−01 | −5.450E−01 | 3.109E−01 | −1.304E−01 | 4.040E−02 |
| S2 | −2.928E+00 | 3.655E+01 | −2.213E+02 | 8.422E+02 | −2.167E+03 | 3.926E+03 | −5.126E+03 |
| S3 | 1.991E−01 | −1.404E+00 | 4.800E+00 | −1.056E+01 | 1.480E+01 | −1.314E+01 | 7.158E+00 |
| S4 | −5.505E−01 | 1.540E+01 | −2.426E+02 | 2.282E+03 | −1.332E+04 | 4.873E+04 | −1.084E+05 |
| S5 | 2.503E−02 | −1.027E+00 | 1.137E+01 | −8.622E+01 | 4.239E+02 | −1.395E+03 | 2.897E+03 |
| S6 | −1.284E+00 | 1.368E+01 | −1.191E+02 | 6.725E+02 | −2.459E+03 | 5.741E+03 | −8.257E+03 |
| S7 | −7.962E−01 | 5.805E−01 | 2.123E+00 | −1.231E+01 | 2.091E+01 | 4.177E+00 | −7.021E+01 |
| S8 | −1.082E−01 | −4.544E−01 | 2.129E+00 | −5.032E+00 | 7.519E+00 | −7.261E+00 | 4.374E+00 |
| S9 | 3.433E−01 | 4.035E−02 | −1.439E+00 | 3.198E+00 | −3.660E+00 | 2.484E+00 | −1.007E+00 |
| S10 | −5.694E−01 | 1.225E+00 | −2.069E+00 | 2.640E+00 | −2.515E+00 | 1.672E+00 | −7.123E−01 |
| S11 | −5.927E−01 | 1.295E+00 | −2.626E+00 | 4.158E+00 | −4.819E+00 | 4.071E+00 | −2.524E+00 |
| S12 | 3.442E−01 | −6.303E−01 | 7.778E−01 | −5.977E−01 | 3.095E−01 | 1−1.107E−01 | 2.675E−02 |
| S13 | 1.838E−02 | −2.901E−01 | 3.961E−01 | −2.075E−01 | −5.485E−02 | 1.744E−01 | −1.469E−01 |
| S14 | −1.656E−01 | 2.426E−01 | −2.939E−01 | 2.626E−01 | −1.658E−01 | 7.338E−02 | −2.278E−02 |

| Surface number | A18 | A20 | A22 | A24 | A26 | A28 | A30 |
|---|---|---|---|---|---|---|---|
| S1 | −9.252E−03 | 1.559E−03 | −1.905E−04 | 1.640E−05 | −9.429E−07 | 3.245E−08 | −5.055E−10 |
| S2 | 4.879E+03 | −3.388E+03 | 1.697E+03 | −5.973E+02 | 1.400E+02 | −1.963E+01 | 1.245E+00 |
| S3 | −2.179E+00 | 2.835E−01 | 0.000E+00 | 0.000E+00 | 0.000E+00 | 0.000E+00 | 0.000E+00 |
| S4 | 1.341E+05 | −7.054E+04 | 0.000E+00 | 0.000E+00 | 0.000E+00 | 0.000E+00 | 0.000E+00 |
| S5 | −3.400E+03 | 1.684E+03 | 0.000E+00 | 0.000E+00 | 0.000E+00 | 0.000E+00 | 0.000E+00 |
| S6 | 6.662E+03 | −2.311E+03 | 0.000E+00 | 0.000E+00 | 0.000E+00 | 0.000E+00 | 0.000E+00 |
| S7 | 9.648E+01 | −4.183E+01 | 0.000E+00 | 0.000E+00 | 0.000E+00 | 0.000E+00 | 0.000E+00 |
| S8 | −1.490E+00 | 2.197E−01 | 0.000E+00 | 0.000E+00 | 0.000E+00 | 0.000E+00 | 0.000E+00 |

| Surface number | A4 | A6 | A8 | A10 | A12 | A14 | A16 |
|---|---|---|---|---|---|---|---|
| S9 | 2.265E−01 | −2.207E−02 | 0.000E+00 | 0.000E+00 | 0.000E+00 | 0.000E+00 | 0.000E+00 |
| S10 | 1.742E−01 | −1.868E−02 | 0.000E+00 | 0.000E+00 | 0.000E+00 | 0.000E+00 | 0.000E+00 |
| S11 | 1.150E+00 | −3.835E−01 | 9.206E−02 | −1.544E−02 | 1.711E−03 | −1.122E−04 | 3.282E−06 |

TABLE 17-continued

| Aspheric coefficients of the lenses of the optical lens 10 in the sixth implementation | | | | | | |
| --- | --- | --- | --- | --- | --- | --- |
| S12 | −4.135E−03 | 3.664E−04 | −1.409E−05 | 0.000E+00 | 0.000E+00 | 0.000E+00 | 0.000E+00 |
| S13 | 7.528E−02 | −2.625E−02 | 6.362E−03 | −1.057E−03 | 1.149E−04 | −7.359E−06 | 2.106E−07 |
| S14 | 4.914E−03 | −7.135E−04 | 6.388E−05 | −2.532E−06 | −9.114E−08 | 1.398E−08 | −4.361E−10 |

In this embodiment, all lenses with the aspheric surfaces satisfy the following formula:

$$z = \frac{cr^2}{1 + \sqrt{1 - Kc^2 r^2}} + A_2 r^2 + A_4 r^4 + \ldots + A_{26} r^{26} + A_{28} r^{28} + A_{30} r^{30}$$

z is a vector height of an aspheric surface, r is a radial coordinate of the aspheric surface, c is a spherical curvature of a vertex on the aspheric surface, K is a conic constant, and A2, A4, A6, A8, A10, . . . , A26, A28, and A30 are aspheric coefficients.

The parameters in Table 17 are substituted into the foregoing formula, so that the lenses of the optical lens 10 in this implementation can be designed. The lenses of the optical lens 10 in this implementation are designed based on the parameters in Table 16 and Table 17, so that the optical lens 10 in this implementation can have basic parameters shown in Table 18.

TABLE 18

| Basic parameters of the optical lens 10 in the sixth implementation | | | |
| --- | --- | --- | --- |
| If1/f I | 1.163 | f(mm) | 1.36 |
| If2/fl | 4.202 | TTL(mm) | 6.81 |
| If3/fl | 2.042 | IMH(mm) | 8.172 |
| If4/fl | 8.964 | FOV(°) | 140° |
| If5/fl | 2.705 | F# | 2.193 |
| If6/fl | 1.140 | IDISTI | 30% |
| If7/fl | 2.556 | D1 | 5.54 |

It can be learned from the basic parameters of the optical lens 10 that, in this implementation, If1/fl=1.163; If2/fl=4.202; If3/fl=2.042; If4/fl=8.964; If5/fl=2.705; If6/fl=1.140; and If7/fl=2.556. In this implementation, different focal lengths are configured for the lenses of the optical lens 10, so that different lenses can have different functions, to ensure that the lens can have a large field of view and a small distortion and the optical lens 10 can have a high modulation transfer function. Therefore, the lens achieves good imaging effect. In addition, the total track length of the optical lens 10 can be reduced as much as possible, to miniaturize the optical lens 10.

In this embodiment, a maximum field of view of the optical lens 10 is 140°, and the maximum optical distortion IDISTI (unit: %)=30% is ensured within a full field of view range. Compared with a common optical lens 10, the optical lens 10 in this implementation can have a large field of view and a small optical distortion, to achieve good imaging effect.

An aperture value F # of the optical lens 10 in this implementation is 2.193, that is, the aperture value F # of the optical lens 10 in this implementation is small, so that the optical lens 10 can be used better under low illumination.

In this implementation, a ratio of a diameter D1 of the first lens 11 to a diagonal length of an effective pixel region on an imaging plane of the optical lens to is ID1/IMHI=0.678. That is, the diameter D1 of the first lens 11 is almost the same as the diagonal length of the effective pixel region on the imaging plane of the optical lens 10, to ensure that the first lens 11 has a large diameter, and ensure a large image taken by the optical lens 10 when the optical lens 10 has a large field of view. In this way, the optical lens can match a photosensitive element with a maximum chief ray angle, and a modulation transfer function of the optical lens 10 is improved.

In this implementation, a ratio of a distance TTL, on an optical axis, between the object-side surface of the first lens L1 of a system and the imaging plane of an imaging lens to the diagonal length of the effective pixel region on the imaging plane of the system is ITTL/IMHI=0.833. In this implementation, the total track length TTL of the optical lens 10 is basically the same as the image height IMH of the image taken by the optical lens 10, so that the optical lens 10 can have a high modulation transfer function, and the lenses of the optical lens 10 can be arranged more compactly. Therefore, an optical length of the optical lens 10 can be small, and the optical lens 10 can be miniaturized, to facilitate use in the small electronic device 1000.

In this implementation, a ratio of a focal length f of the optical lens 10 to the total track length TTL of the optical lens 10 is If/TTLI=0.200. In this implementation, the lenses of the optical lens 10 can be arranged more compactly, and a distance between the lens of the optical lens 10 and the imaging plane can be small, to ensure that the total track length of the optical lens 10 can be small. Therefore, the optical lens 10 can be miniaturized, to facilitate use in the small electronic device 1000.

Figure 27:
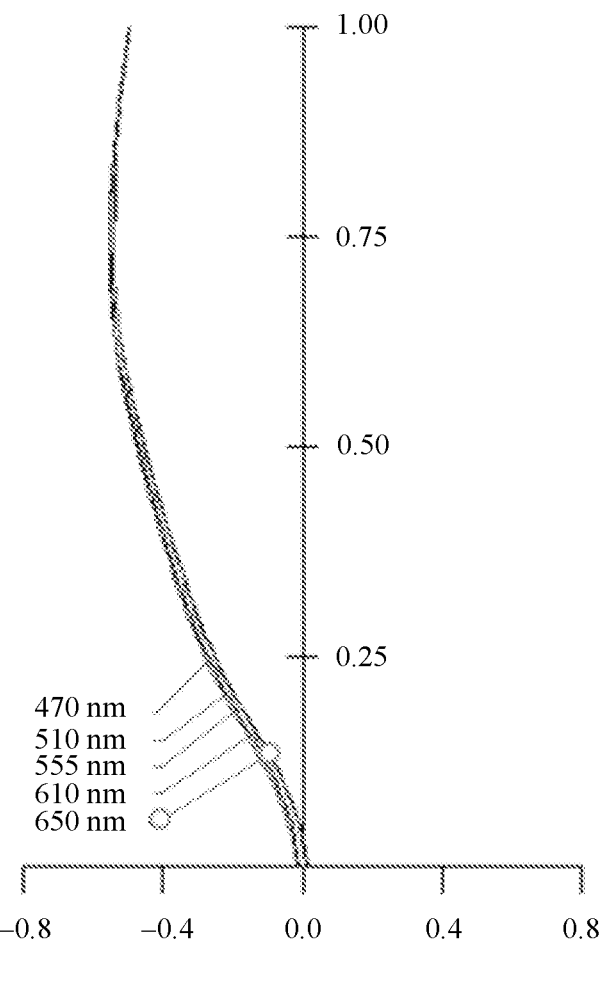
FIG. 27 is a diagram of spherical aberrations obtained after light with wavelengths of 650 nm, 610 nm, 555 nm, 510 nm, and 470 nm passes through an optical lens according to Embodiment 6.
Figure 28:
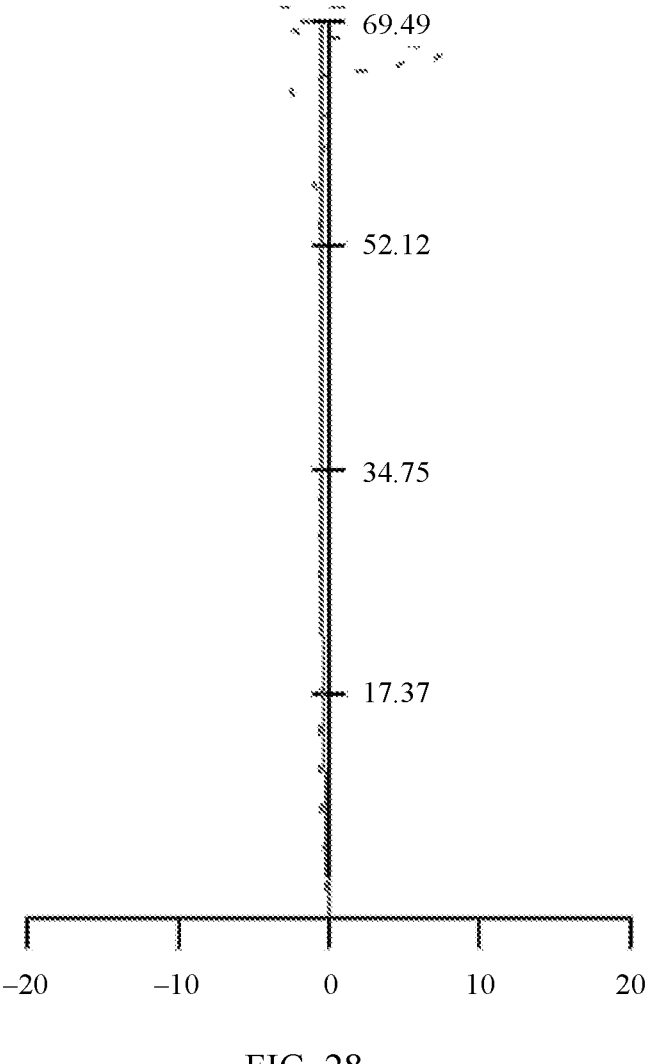
FIG. 28 is a diagram of astigmatism and field curvature that are obtained after light with a wavelength of 555 nm passes through an optical lens according to Embodiment 6.
Figure 29:
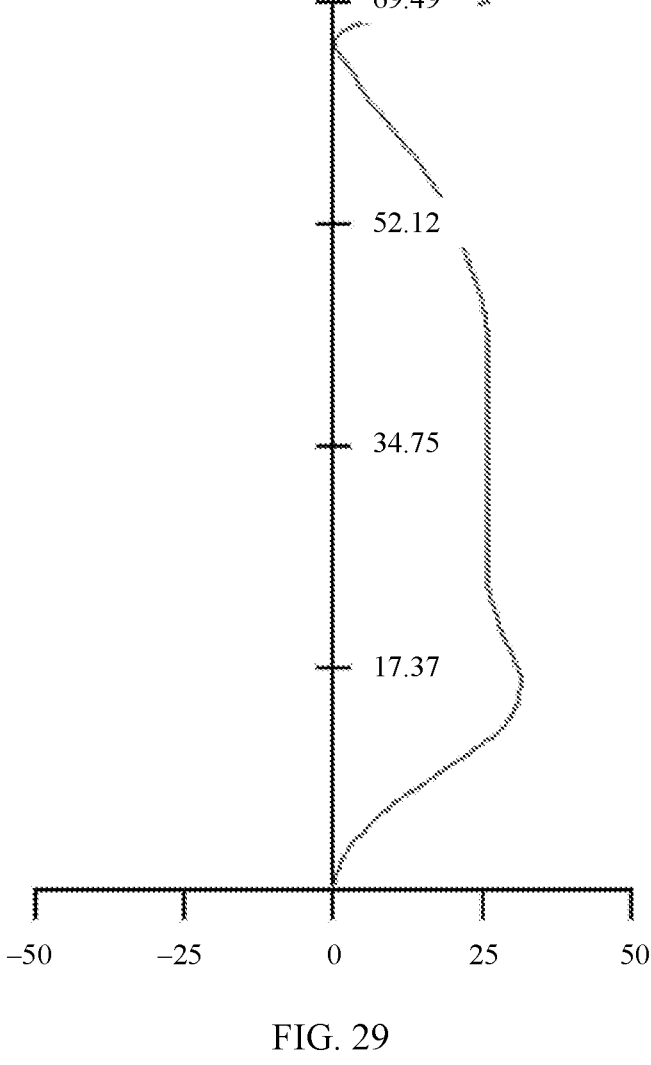
FIG. 29 is a diagram of a distortion obtained after light with a wavelength of 555 nm passes through an optical lens according to Embodiment 6.

FIG. 27 to FIG. 29 are diagrams representing optical performance of the optical lens 10 according to the sixth implementation.

Specifically, FIG. 27 is a diagram of spherical aberrations obtained after light with wavelengths of 650 nm, 610 nm, 555 nm, 510 nm, and 470 nm passes through the optical lens 10 according to the sixth implementation. In FIG. 27, a vertical coordinate represents normalized pupil coordinates, and a horizontal coordinate represents spherical aberration values in a unit of millimeter. It can be learned from FIG. 27 that, in this embodiment, the spherical aberrations obtained after light in different bands passes through the optical lens 10 are all small, that is, a spherical aberration obtained during imaging of the optical lens 10 in this implementation is small. Therefore, the optical lens 10 in this implementation has good optical imaging effect.

FIG. 28 is a diagram of astigmatism and field curvature that are obtained after the light with the wavelength of 555 nm passes through the optical lens 10 according to the sixth implementation. In FIG. 28, a vertical coordinate represents a field of view in a unit of degree (°), and a horizontal coordinate represents an astigmatism value and a field curvature value of the optical lens 10 in a unit of millimeter (mm). A solid line represents the field curvature value of light with a center wavelength (555 nm) on a meridian image plane, and a dashed line represents a field curvature value of the light with the center wavelength (555 nm) on a sagittal image plane. It can be learned from the figure that, the astigmatism and the field curvature, in a sagittal direction and a meridian direction, obtained after the light passes through the optical lens 10 in this implementation are both small, that is, the astigmatism and field curvature obtained during imaging of the optical lens 10 in this implementation are both small. Therefore, the optical lens 10 in this implementation has good optical imaging effect.

FIG. 29 is a diagram of a distortion obtained after the light with the wavelength of 555 nm passes through the optical lens 10 according to the sixth implementation. In FIG. 29, a vertical coordinate represents a field of view in a unit of degree (°), and a horizontal coordinate represents a distortion value in a unit of %, obtained after the light with the wavelength of 555 nm passes through the optical lens 10 in the sixth implementation. It can be learned from the figure that the distortion obtained after the light passes through the optical lens 10 in this implementation is small, that is, an imaging distortion of the optical lens 10 in this implementation is small. Therefore, the optical lens 10 in this implementation can achieve a large field of view, and has a small distortion, to achieve good optical imaging effect.

In this implementation of this application, the seven lenses are disposed in the optical lens 10 for imaging, and parameters of the lenses are optimized and coordinated, so that the optical lens 10 can have a large field of view range, and a small distortion during imaging of the optical lens 10 can be further ensured. Specifically, in this implementation of this application, the first lens 11 is a lens bent towards the image side, and the first lens 11 is a lens having a negative focal power, so that a scene within a larger field of view range can enter the optical lens 10, and the field of view of the optical lens 10 is increased. In addition, in this implementation of this application, there is at least one inflection point on the object-side surface of the sixth lens 16 and/or the object-side surface of the seventh lens 17, so that the sixth lens 16 and/or the seventh lens 17 function/functions well in adjusting an optical distortion and eliminating an aberration. This can reduce a distortion of the optical lens 10, and further ensure that the optical lens 10 can have a large field of view and a small distortion, to achieve good optical effect. In some implementations, the object-side surface of the first lens 11 is also a surface having at least one inflection point, so that the first lens 11 can also function well in adjusting an optical distortion and eliminating an aberration. This can reduce a distortion of the optical lens 10, and ensure that the optical lens 10 can have a large field of view and a small distortion. In some implementations, the aperture D1 of the first lens 11 is matched with the diagonal length IMH of the effective pixel region on the imaging plane of the optical lens 10, to ensure that the optical lens 10 has a large field of view and a high modulation transfer function. In some implementations, the focal length f1 of the first lens 11, the focal length f1 of the seventh lens 17, and the focal length f of the optical lens 10 are limited, so that the focal power of the first lens 11 and the focal power of the seventh lens 17 can be properly allocated, to coordinate to correct the aberration of the optical lens 10. This reduces a distortion, and improves imaging quality of the optical lens 10.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising:
a first lens, a second lens, a third lens, a fourth lens, a fifth lens, a sixth lens, and a seventh lens that are sequentially arranged from an object side of the optical lens to an image side of the optical lens, wherein:
the first lens is a lens bent towards the image side, and the first lens has a negative focal power,
each of the first lens, the second lens, the third lens, the fourth lens, the fifth lens, the sixth lens and the seventh lens comprises an object-side surface facing the object side and an image-side surface facing the image side,
the object-side surface and the image-side surface of each of the sixth lens and the seventh lens are free-form surfaces,
the object-side surface of the sixth lens or the object-side surface of the seventh lens comprises at least one inflection point, and the optical lens meets the following relationship:
FOV≥125°, and |DIST|≤40%,
where FOV is a field of view of the optical lens, and DIST is a distortion parameter of imaging of the optical lens,
a combined focal power of the second lens and the third lens is a positive focal power,
a combined focal power of the fourth lens and the fifth lens is a negative focal power, and
a combined focal power of the sixth lens and the seventh lens is a negative focal power.

2. The optical lens according to claim 1, wherein the object-side surface of the first lens comprises at least one inflection point.

3. The optical lens according to claim 1, wherein the optical lens meets the following relationship:

$$0.5 \le |D1/IMH| \le 1.5, \text{ where}$$

D1 is a diameter of the first lens, and IMH is a diagonal length of an effective pixel region on an imaging plane of the optical lens.

4. The optical lens according to claim 1, wherein the optical lens meets the following relationship:

$$1.5 \le F\# \le 2.8, \text{ where}$$

F # is an aperture F-number of the optical lens.

5. The optical lens according to claim 1, wherein the optical lens meets the following relationship:

$$0.8 \le |TTL/IMH| \le 1.5, \text{ where}$$

TTL is a total track length of the optical lens, and IMH is a diagonal length of an effective pixel region on an imaging plane of the optical lens.

6. The optical lens according to claim 1, wherein the optical lens meets the following relationship:

$$0.1 \le |f/TTL| \le 0.4, \text{ where}$$

f is a focal length of the optical lens, and TTL is a total track length of the optical lens.

7. The optical lens according to claim 1, wherein the optical lens meets the following relationship:

$$1.5 \le |f1/f| \le 2, \text{ where}$$

f1 is a focal length of the first lens, and f is a focal length of the optical lens.

8. The optical lens according to claim 1, wherein the optical lens meets the following relationship:

$$2.5 \le |f7/f| \le 4, \text{ where}$$

f7 is a focal length of the seventh lens, and f is the focal length of the optical lens.

9. The optical lens according to claim 1, wherein the fourth lens and the seventh lens each have a negative focal power.

10. A camera, comprising:

an optical lens, comprising:

a first lens, a second lens, a third lens, a fourth lens, a fifth lens, a sixth lens, and a seventh lens that are sequentially arranged from an object side of the optical lens to an image side of the optical lens, wherein:

the first lens is a lens bent towards the image side, and the first lens has a negative focal power, each of the first lens, the second lens, the third lens, the fourth lens, the fifth lens, the sixth lens and the seventh lens comprises an object-side surface facing the object side and an image-side surface facing the image side, the object-side surface and the image-side surface of each of the sixth lens and the seventh lens are free-form surfaces, the object-side surface of the sixth lens or the object-side surface of the seventh lens comprises at least one inflection point, and the optical lens meets the following relationship:

$$FOV \geq 125°, \text{ and } |DIST| \leq 40\%,$$

where FOV is a field of view of the optical lens, and DIST is a distortion parameter of imaging of the optical lens, a combined focal power of the second lens and the third lens is a positive focal power, a combined focal power of the fourth lens and the fifth lens is a negative focal power, and a combined focal power of the sixth lens and the seventh lens is a negative focal power; and a photosensitive element located on the image side of the optical lens, wherein the optical lens is configured to project light from the object side of the optical lens to the photosensitive element.

11. The camera according to claim 10, wherein the object-side surface of the first lens comprises at least one inflection point.

12. The camera according to claim 10, wherein the optical lens meets the following relationship:

$$0.5 \leq |D1/IMH| \leq 1.5,$$

where D1 is a diameter of the first lens, and IMH is a diagonal length of an effective pixel region on an imaging plane of the optical lens.

13. The camera according to claim 10, wherein the optical lens meets the following relationship:

$$1.5 \leq F\# \leq 2.8,$$

where F # is an aperture F-number of the optical lens.

14. The camera according to claim 10, wherein the optical lens meets the following relationship:

$$0.8 \leq |TTL/IMH| \leq 1.5,$$

where TTL is a total track length of the optical lens, and IMH is a diagonal length of an effective pixel region on an imaging plane of the optical lens.

15. An electronic device, comprising:

an image processor; and a camera communicatively connected to the image processor, the camera is configured to: obtain image data and input the image data into the image processor, and the image processor is configured to process the image data output by the camera to the image processor, wherein the camera comprises:

an optical lens, comprising a first lens, a second lens, a third lens, a fourth lens, a fifth lens, a sixth lens, and a seventh lens that are sequentially arranged from an object side of the optical lens to an image side of the optical lens, wherein:

the first lens is a lens bent towards the image side, and the first lens has a negative focal power, each of the first lens, the second lens, the third lens, the fourth lens, the fifth lens, the sixth lens and the seventh lens comprises an object-side surface facing the object side and an image-side surface facing the image side, the object-side surface and the image-side surface of each of the sixth lens and the seventh lens are free-form surfaces, and the object-side surface of the sixth lens or the object-side surface of the seventh lens comprises at least one inflection point, and the optical lens meets the following relationship:

$$FOV \geq 125°, \text{ and } |DIST| \leq 40\%,$$

where FOV is a field of view of the optical lens, and DIST is a distortion parameter of imaging of the optical lens, a combined focal power of the second lens and the third lens is a positive focal power, a combined focal power of the fourth lens and the fifth lens is a negative focal power, and a combined focal power of the sixth lens and the seventh lens is a negative focal power; and a photosensitive element located on the image side of the optical lens, wherein the optical lens is configured to project light from the object side of the optical lens to the photosensitive element.

16. The electronic device according to claim 15, wherein the object-side surface of the first lens comprises at least one inflection point.

17. The electronic device according to claim 15, wherein the optical lens meets the following relationship:

$$0.5 \leq |D1/IMH| \leq 1.5,$$

where D1 is a diameter of the first lens, and IMH is a diagonal length of an effective pixel region on an imaging plane of the optical lens.

18. The electronic device according to claim 15, wherein the optical lens meets the following relationship:

$$1.5 \leq F\# \leq 2.8,$$

where F # is an aperture F-number of the optical lens.

19. The electronic device according to claim 15, wherein the optical lens meets the following relationship: $0.8 \leq |TTL/IMH| \leq 1.5$, where TTL is a total track length of the optical lens, and IMH is a diagonal length of an effective pixel region on an imaging plane of the optical lens.

20. The electronic device according to claim 15, wherein the optical lens meets the following relationship:

$$1.5 \leq |f1/f| \leq 2, \text{ where}$$

f1 is a focal length of the first lens, and f is a focal length of the optical lens.

\* \* \* \* \*